(12) United States Patent
Needelman et al.

(10) Patent No.: US 6,512,979 B1
(45) Date of Patent: Jan. 28, 2003

(54) LOST-IN-SPACE STELLAR ATTITUDE ACQUISITION USING MULTIPLE STAR TRACKERS

(75) Inventors: David D. Needelman, Torrance, CA (US); Yeong-Wei A. Wu, Rancho Palos Verdes, CA (US); Rongsheng Li, Hacienda Heights, CA (US); William L. Burkett, Jr., Redondo Beach, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/177,238

(22) Filed: Jun. 21, 2002

Related U.S. Application Data

(63) Continuation of application No. 09/708,132, filed on Nov. 7, 2000.

(51) Int. Cl.[7] .............................................. G01C 21/24
(52) U.S. Cl. ....................................... 701/222; 244/171
(58) Field of Search ................................ 701/222, 226; 244/171; 250/203.6

(56) References Cited

U.S. PATENT DOCUMENTS

| | | | | |
|---|---|---|---|---|
| 5,412,574 A | * | 5/1995 | Bender et al. | 701/222 |
| 5,745,869 A | * | 4/1998 | Van Bezooijen | 701/222 |

* cited by examiner

*Primary Examiner*—Richard M. Camby
(74) *Attorney, Agent, or Firm*—Gates & Cooper LLP

(57) ABSTRACT

A method, apparatus, article of manufacture for determining the attitude of a spacecraft having at least one star sensor. The method comprises the steps of selecting a first reference star sensor from among the star sensors; designating two stars observed by the first reference star sensor as a primary star pair; identifying a candidate star pair corresponding to the primary star pair, wherein the candidate star pair is selected from a star catalog having a plurality of entries; estimating an inertial orientation of the first star sensor at least in part from the identified candidate star pair; and determining the spacecraft attitude from the estimated inertial orientation of a reference star sensor selected from a group comprising the first star sensor.

90 Claims, 8 Drawing Sheets

LOST-IN-SPACE STELLAR ATTITUDE ACQUISITION USING MULTIPLE STAR TRACKERS

CROSS REFERENCE TO RELATED APPLICATIONS

This application is a continuation of U.S. patent application Ser. No. 09/708,132, entitled "LOST-IN-SPACE STELLAR ATTITUDE ACQUISITION USING MULTIPLE STAR TRACKERS," by David D. Needelman, Yeong-Wei A. Wu, Rongsheng Li, and William L. Burkett, Jr., filed Nov. 7, 2000, which application is hereby incorporated by reference herein.

This application is also related to U.S. patent application Ser. No. 09/454,424, and entitled "CONFUSED-IN-SPACE STELLAR ATTITUDE ACQUISITION USING MULTIPLE STAR TRACKERS," by David D. Needelman filed on Dec. 3, 1999, now U.S. Pat. No. 6,266,616, issued Jul. 24, 2001, which application is hereby incorporated by reference herein.

BACKGROUND OF THE INVENTION

1. Field of the Invention

The present invention relates to systems and methods for navigation and control of spacecraft, and in particular to a system and method for determining the attitude of a spacecraft having at least one star sensor.

2. Description of the Related Art

Satellites enjoy widespread use for a variety of applications, including communications, surveillance, and data gathering. To perform their design mission, most satellites require accurate information regarding the spacecraft and payload attitude.

For applications where high bandwidth satellite attitude data is required, such data is typically obtained by on-board inertial measurement instruments such as inertial reference units having a plurality of gyros and accelerometers. However, while such instruments can provide high bandwidth information regarding the spacecraft attitude, they can only do so with respect to a datum attitude reference. Errors in this attitude reference propagate throughout the satellite navigation system. At the same time, it occasionally occurs that satellites lose their attitude reference, and must reacquire the reference with on-board sensors such as sun and earth sensors. When the satellite's attitude datum has been entirely lost (a lost-in-space-scenario), the satellite must determine its attitude reference completely anew. When the accuracy of the attitude datum has been compromised, but not lost, (a confused-in-space scenario), the satellite must also determine its attitude reference anew.

Most attitude acquisition algorithms use a single star tracker to estimate the satellite attitude. Unfortunately, current attitude acquisition algorithms have no capability to deal with multiple star trackers. For example, the system disclosed in U.S. Pat. No. 5,745,869, issued to van Bezooijen on Apr. 28, 1998 and hereby incorporated by reference herein, is designed to work with data from a single star tracker.

The star acquisition method disclosed in the van Bezooijen patent uses an autonomous star tracker (AST). The method breaks up a star catalog into a "Guide Star Database" (~4400 stars) and "Supplementary (Auxiliary) Guide Star Database" (~8800 stars); the former including brighter stars and data concerning pairs of stars. The AST is used to track four bright stars to be found in the Guide Star Database. If four stars are unavailable, three stars from the Guide Star Database and one from the Supplementary Database are tracked. A pattern match is executed to identify stars. An attitude estimate is then formulated from the identified stars. Van Bezooijen's method identifies stars by setting up "match groups" (groups of stars with a "kernel" star in common), whose angular separation matches those of cataloged star pairs. Once the stars are identified, the attitude of the spacecraft can be determined. However, this technique requires the processing of multiple groups of multiple stars, increasing the number of required computations.

Further, many acquisition algorithms are designed to work with "smart" star trackers that are capable of using a built-in star catalog to determine which star is being tracked. Such an algorithm is disclosed in U.S. Pat. No. 5,412,574, issued to Bender, Parks, and Brozenec on May 2, 1995. Such systems cannot utilize minimum capability star trackers, such as the CT-602 available from the BALL Corporation, which can only identify star positions (in the star tracker reference frame) and corresponding star instrument magnitudes.

Hence, there is a need for a device and method for estimating the attitude of a spacecraft that can utilize data from multiple star trackers. There is also a need for a device and method that can determine spacecraft attitude from a single star pair. The present invention satisfies that need.

SUMMARY OF THE INVENTION

To address the requirements described above, the present invention discloses a method, apparatus, and article of manufacture for determining the attitude of a spacecraft having at least one star sensor, with such determination requiring only star sensor data. In the event that other attitude-related information is available, this invention can use such information to reduce processing time required to produce an answer. Furthermore, if more than one star sensor is available, the present invention can form an estimate of the sensor alignments.

The method comprises the steps of selecting a first reference star sensor from among the star sensors; designating two stars observed by the first reference star sensor as a primary star pair; identifying a candidate star pair corresponding to the primary star pair, wherein the candidate star pair is selected from a star catalog having a plurality of entries; estimating an inertial orientation of the first star sensor at least in part from the identified candidate star pair; determining the spacecraft attitude from the estimated inertial orientation of a reference star sensor selected from a group comprising the first star sensor. In one embodiment, the apparatus comprises means for performing the above-described method steps, and the article of manufacture comprises a program storage device tangibly embodying computer-readable instructions for performing the method steps.

Thus, the present invention has several advantages over the prior art. While the present invention may work with data from a single star tracker, it is designed to accept and use data from multiple star trackers, if observations from more than one tracker are available. If such is the case, the present invention can produce an estimate of the alignment of each tracker (i.e., the orientation of the sensor with respect to the spacecraft body, with respect to one or more "reference" tracker(s), in addition to the attitude estimate. Further, the present invention allows the use of lower capability star trackers that can only identify star position (in the tracker frame). If star instrument magnitude is available from the star tracker, the present invention will allow its use to produce attitude and alignment estimates faster than otherwise. If attitude-related information is available from some source, the present invention will allow its use to produce attitude and alignment estimates faster than otherwise.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Summary

The system and method described by the present invention allows the estimation of the attitude of spacecraft equipped with at least one star tracker, capable of simultaneously tracking multiple ($N_{max}$) stars. In one embodiment, the star trackers are each capable of simultaneously tracking five stars ($N_{max} \sim 5$). The present invention determines attitude using identified ("matching") stars observed by the tracker(s) as entries in a star catalog (SC). The SC is a list of star positions with respect to some inertial frame (the Earth Centered Inertial frame, ECI, for the preferred embodiment). If the star sensor outputs star instrument magnitudes (the magnitude of a star as "seen" by the sensor), the star catalog can include star instrument magnitudes, and (if necessary), star classes, in order to speed up processing.

In addition to the star catalog, the present invention also uses a Pair Catalog (PC). Each entry in the PC represents a pair of stars with an angular separation in a given range, $[\alpha_{min}, \alpha_{max}]$ ($[2°, 8\sqrt{2}°]$, for the preferred embodiment). The PC entries include SC indices of both stars in the pair, and angular separation of the stars. If the SC includes magnitude, inclusion in the PC may be limited to stars of magnitude $M_0^{PC}$, or brighter ($M_0^{PC}=6$, for the preferred embodiment).

The present invention is designed for either on-board (autonomous) or ground usage, and does not require a priori attitude-related information. It can, however, make use of such information, should it be available. The present invention is also operable with multiple star trackers of limited capability (i.e., trackers only able to determine magnitude and relative position of stars, as opposed to identifying them), as opposed to a single smart tracker. The present invention can make efficient use of tracker-provided magnitude information, should such be available.

Figure 1:
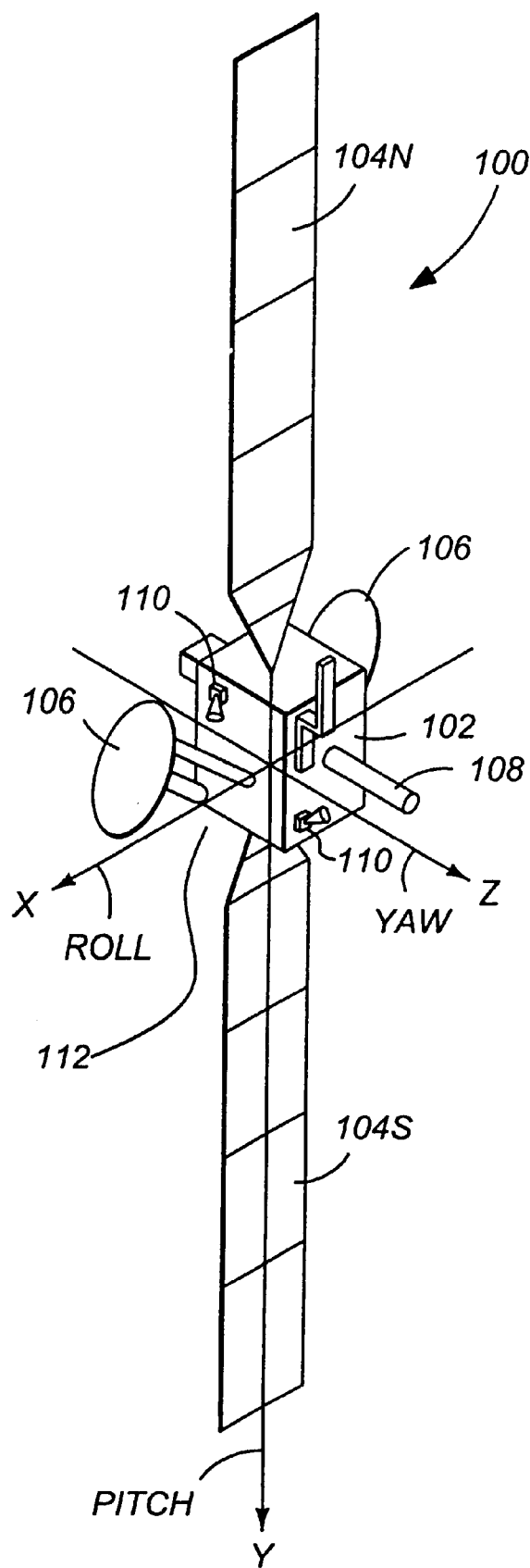
FIG. 1 illustrates a three-axis stabilized satellite or spacecraft.

FIG. 1 illustrates a three-axis stabilized satellite or spacecraft 100. The spacecraft 100 is preferably situated in a stationary orbit about the Earth. The satellite 100 has a main body 102, a pair of solar panels 104, a pair of high gain narrow beam antennas 106, and a telemetry and command omnidirectional antenna 108 which is aimed at a control ground station. The satellite 100 may also include one or more sensors 110 to measure the attitude of the satellite 100. These sensors may include sun sensors, earth sensors, and star sensors. Since the solar panels are often referred to by the designations "North" and "South", the solar panels in FIG. 1 are referred to by the numerals 104N and 104S for the "North" and "South" solar panels, respectively.

FIG. 1 also illustrates the spacecraft 100 reference frame 112. This reference frame 112 is a body-fixed frame, defined so that the object attached to the spacecraft body 102 has an essentially constant position with respect to that frame. The attitude is the orientation of the body-fixed frame with respect to an inertial frame.

The Y (pitch) axis is chosen to be parallel to the solar panel 104 longitudinal axis. The solar panels 104N and 104S (hereinafter alternatively referred to as solar panels 104) are designed to rotate about that axis, but the axis itself is typically fixed in the body frame. The X and Z axes are normal to faces of the spacecraft body 102. The X axis, which typically "points" in the direction of spacecraft 100 motion, is the roll axis and the Z axis, which typically "points" to Earth, is the yaw axis. As this frame is body-fixed, even if the spacecraft 100 is at an orientation where the X and Z axes are not pointing in the direction of motion, and Earth 302, respectively, the axes do not change. They are still defined as in FIG. 1.

Figure 2:
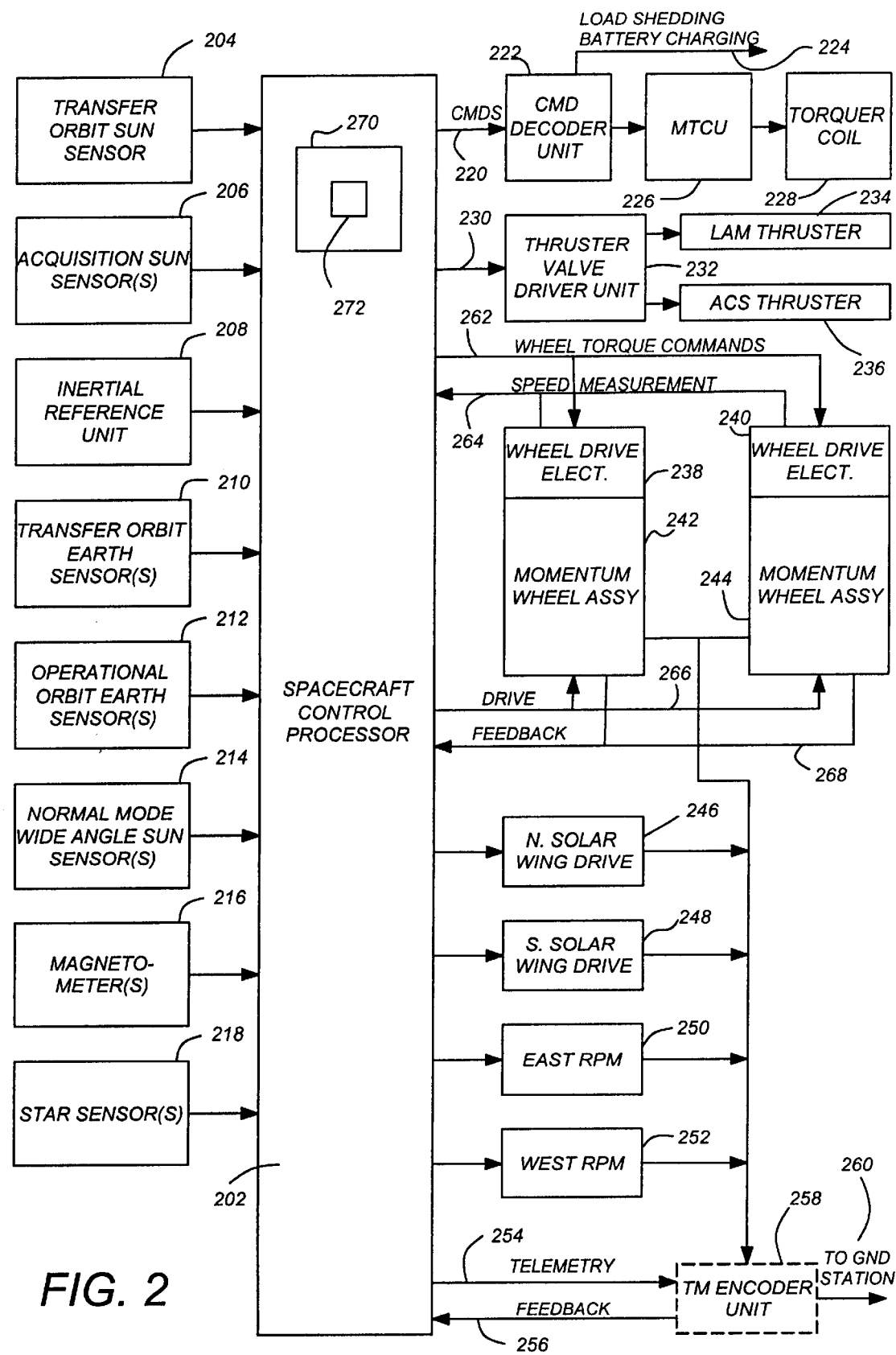
FIG. 2 is a diagram depicting the functional architecture of a representative attitude control system.

FIG. 2 is a diagram depicting the functional architecture of a representative attitude control system. Control of the spacecraft is provided by a computer or multiple computers, referred to as a spacecraft control processor(s) (SCP) 202. The SCP 202 performs a number of functions which may include post ejection sequencing, transfer orbit processing, acquisition control, stationkeeping control, normal mode control, mechanisms control, fault protection, and spacecraft systems support, among others. The post ejection sequencing could include initializing to ascent mode and thruster active nutation control (TANC). The transfer orbit processing could include attitude data processing, thruster pulse firing, perigee assist maneuvers, and liquid apogee motor (LAM) thruster firing. The acquisition control could include idle mode sequencing, sun search/acquisition, and Earth search/acquisition. The stationkeeping control could include auto mode sequencing, gyro calibration, stationkeeping attitude control and transition to normal. The normal mode control could include attitude estimation, attitude and solar array steering, momentum bias control, magnetic torquing, and thruster momentum dumping (H-dumping). The mechanism mode control could include solar panel control and reflector positioning control. The spacecraft control systems support could include tracking and command processing, battery charge management and pressure transducer processing.

Input to the spacecraft control processor 202 may come from any combination of a number of spacecraft components and subsystems, such as a transfer orbit sun sensor 204, an acquisition sun sensor 206, an inertial reference unit 208, a transfer orbit Earth sensor 210, an operational orbit Earth sensor 212, a normal mode wide angle sun sensor 214, a magnetometer 216, and one or more star sensors 218.

The SCP 202 generates control signal commands 220 that are directed to a command decoder unit 222. The command decoder unit operates the load shedding and battery charging systems 224. The command decoder unit also sends signals to the magnetic torque control unit (MTCU) 226 and the torque coil 228.

The SCP 202 also sends control commands 230 to the thruster valve driver unit 232 which in turn controls the liquid apogee motor (LAM) thrusters 234 and the attitude control thrusters 236.

Wheel torque commands 262 are generated by the SCP 202 and are communicated to the wheel speed electronics 238 and 240. These effect changes in the wheel speeds for wheels in momentum wheel assemblies 242 and 244, respectively. The speed of the wheels is also measured and fed back to the SCP 202 by feedback control signal 264.

The spacecraft control processor 202 also sends jackscrew drive signals 266 to the momentum wheel assemblies 242 and 244. These signals control the operation of the jackscrews individually and thus the amount of tilt of the momentum wheels. The position of the jackscrews is then fed back through command signal 268 to the spacecraft control processor 202. The signals 268 are also sent to the telemetry encoder unit 258 and in turn to the ground station 260.

The spacecraft control processor 202 also sends command signals 254 to the telemetry encoder unit 258 that in turn sends feedback signals 256 to the SCP 202. This feedback loop, as with the other feedback loops to the SCP 202 described earlier, assist in the overall control of the spacecraft. The SCP 202 communicates with the telemetry encoder unit 258, which receives the signals from various spacecraft components and subsystems indicating current operating conditions, and then relays them to the ground station 260. Data received may also be received by the telemetry encoder unit 258 from the ground station 260 and passed to the SCP 202.

The wheel drive electronics 238, 240 receive signals from the SCP 202 and control the rotational speed of the momentum wheels. The jackscrew drive signals 266 adjust the orientation of the angular momentum vector of the momentum wheels. This accommodates varying degrees of attitude steering agility and accommodates movement of the spacecraft 100 as required.

The use of reaction wheels or equivalent internal torquers to control a momentum bias stabilized spacecraft allows inversion about yaw of the attitude at will without change to the attitude control. In this sense, the canting of the momentum wheel is entirely equivalent to the use of reaction wheels.

Other spacecraft employing external torquers, chemical or electric thrusters, magnetic torquers, solar pressure, etc. cannot be inverted without changing the control or reversing the wheel spin direction. This includes momentum bias spacecraft that attempt to maintain the spacecraft body fixed and steer payload elements with payload gimbals.

The SCP 202 may include or have access to memory 270, such as a random access memory (RAM), programmable read only memory (PROM), or electrically erasable programmable read only memory (EEPROM). Generally, the SCP 202 operates under control of an operating system 272 stored in the memory 270, and interfaces with the other system components to accept inputs and generate outputs, including commands. Applications running in the SCP 202 access and manipulate data stored in the memory 270. The spacecraft 100 may also comprise an external communication device such as a satellite link for communicating with other computers at, for example, a ground station. If necessary, operation instructions for new applications can be uploaded from ground stations.

In one embodiment, instructions implementing the operating system 272, application programs, and other modules are tangibly embodied in a computer-readable medium, e.g., data storage device, which could include a RAM, PROM, EEPROM, or other memory device. Further, the operating system 272 and the computer program are comprised of instructions which, when read and executed by the SCP 202, causes the spacecraft processor 202 to perform the steps necessary to implement and/or use the present invention. Computer program and/or operating instructions may also be tangibly embodied in memory 270 and/or data communications devices (e.g. other devices in the spacecraft 100 or on the ground), thereby making a computer program product or article of manufacture according to the invention. As such, the terms "program storage device," "article of manufacture" and "computer program product" as used herein are intended to encompass a computer program accessible from any computer readable device or media.

Reference Frames Used in Attitude Determination

Spacecraft attitude is the orientation of the spacecraft 100 with respect to some known reference frame.

One possible reference frame is fixed with respect to both the Earth 302 and the Sun 304. This reference frame is useful because the satellite's mission is usually concerned primarily with pointing antennae at the Earth 302, and directing the solar panels 104 to at the Sun 304. Attitude determination in such a frame requires finding where the centers of the Sun and Earth are with respect to the spacecraft 100.

One problem with using such a reference frame is that it is hard to determine exactly where the center of the Sun and/or Earth is with respect to a spacecraft 100 at any given time. Sun sensors 214 and earth sensors 212, which are used for such purposes, give errors of approximately 0.02 degree and 0.05 degree, respectively. Hence, attitude estimates based on such readings will be off by 0.02 degree, or more. In many cases, this accuracy is insufficient to meet current satellite mission requirements.

The attitude of the spacecraft 100 can also be expressed in accordance with an inertial reference frame. The attitude of the spacecraft 100 in an inertial reference frame can be determined directly from the observation of inertially fixed objects, such as stars, instead of moving objects such as the Sun and Earth. Because a typical star sensor 218 is accurate to about 15 arc-seconds (0.004 degree), attitude estimates formulated using star rackers are more accurate than estimates formulated using conventional Sun and Earth sensors 214 and 212. Once the spacecraft attitude is known in the inertial reference frame, the orbital information of the spacecraft 100, the Sun, and the Earth can be used to compute the angular positions of the Sun and the Earth relative to the satellite 100.

Figure 3:
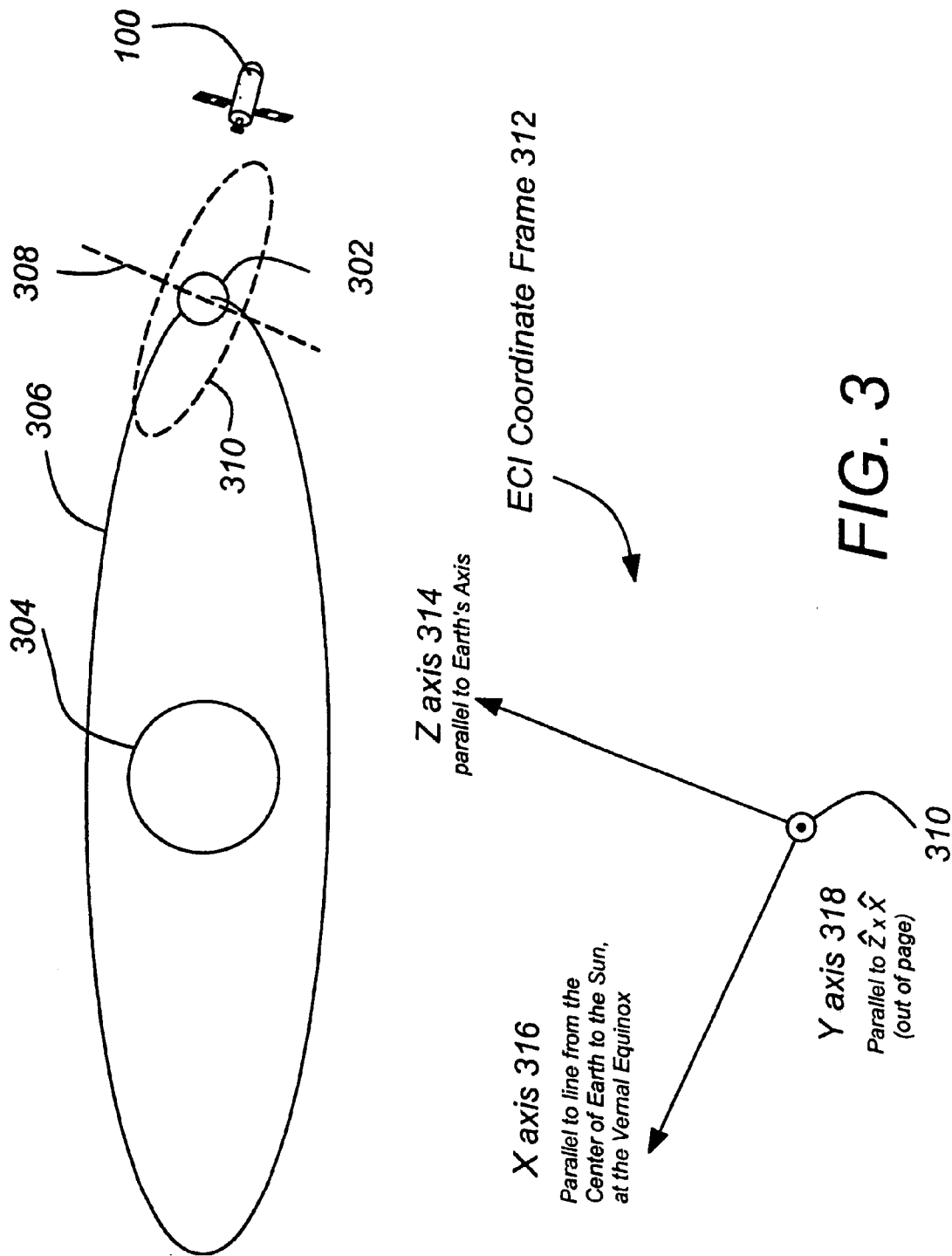
FIG. 3 is a diagram showing an Earth-Centered Inertial (ECI) reference frame.

FIG. 3 is a diagram showing an Earth-Centered Inertial (ECI) reference frame 312 used for one embodiment of the Confused-in-Space Stellar Attitude Acquisition (CISSAA) method described herein. The origin 310 of the ECI reference frame 312 (where the X axis 316, the Y axis 318, and the Z axis 314 meet) is defined at the current position of the satellite 100. The position of the origin changes in time, but the orientation of axes 314–318 do not. The Z-axis 314 is taken to be parallel to Earth's spin axis 302, pointing north. The X and Y axes are perpendicular to the Z-axis 314, and are therefore parallel to vectors lying in Earth's 302 equatorial plane 310. The X-axis 316 is chosen to be parallel to a line lying in the plane of the ecliptic 306 (the plane containing the orbits of the planets), as well as the equatorial plane. The X axis 316 can be defined as the line from the center of the Earth 302 to the Sun 304 at the vernal equinox (March 21). The stars' positions in this frame are referenced by unit vectors pointing from the spacecraft 100 to the star. Throughout this disclosure, all vectors are taken to be of unit length, unless specified otherwise. The star positions are nearly fixed in the ECI reference frame 312.

Since the origin of the frame is at the spacecraft 100 position, spacecraft 100 motion affects ECI position of the stars. However, in practice, the stars are far enough away so that the unit vectors remain essentially constant as the spacecraft 100 moves. The above definition of the ECI reference frame 312 also ignores the fact that the orientation of Earth's axis changes over time. This is because the Earth precession period is about 26,000 years. Therefore, the axes 314–318 of the ECI reference frame 310 is often specified with respect to a particular time (e.g., noon, Jan. 1, 2000).

Figure 4:
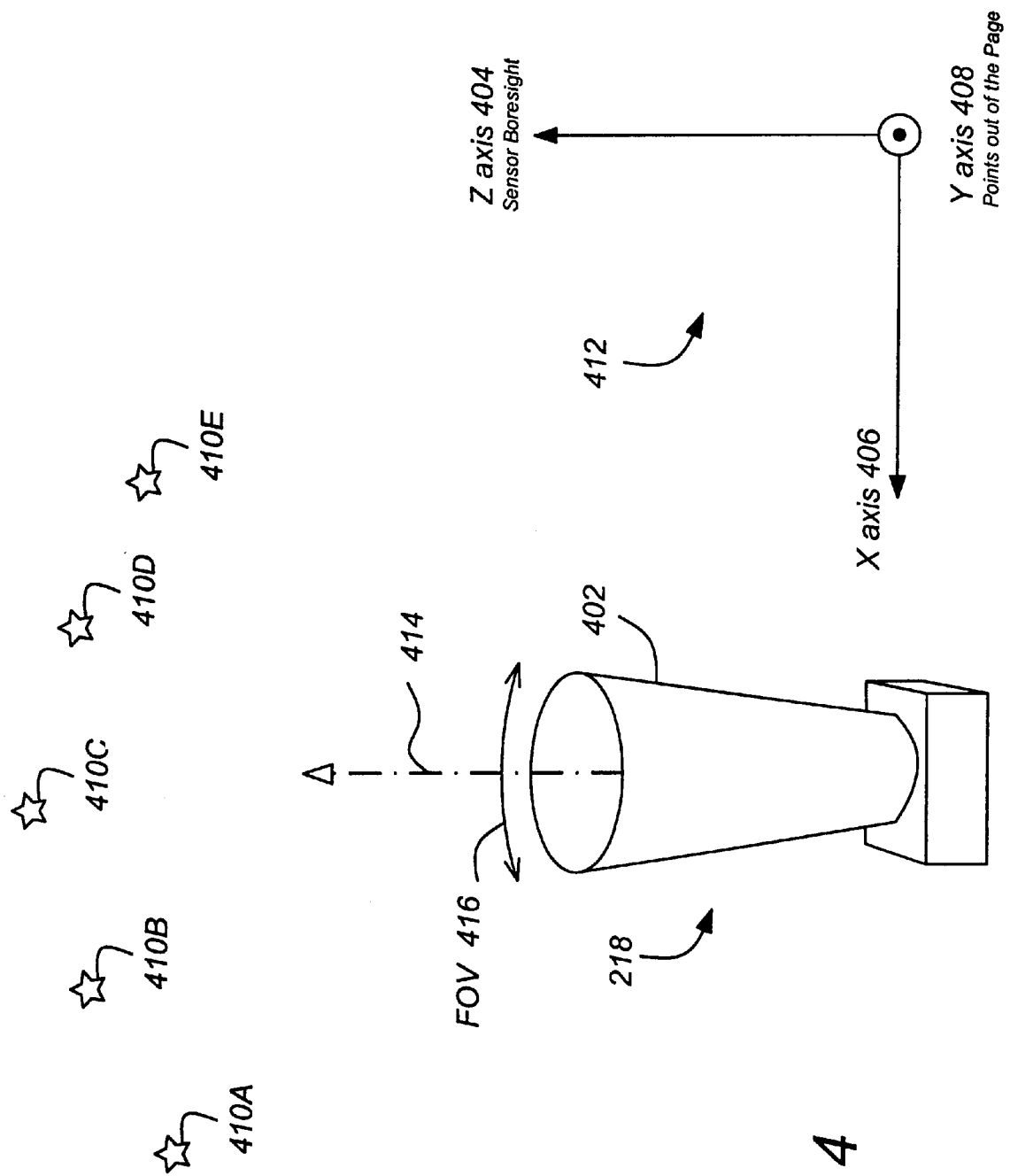
FIG. 4 is a diagram showing a reference frame for a typical star sensor.

FIG. 4 is a diagram showing a reference frame for a typical star sensor 218 and sun shade 402. In most cases, star sensors 218 (hereinafter alternatively referred to as star trackers) make star observations with respect to a body-fixed reference frame pertaining to the star tracker only. A star sensor 218 is an apparatus that can provide star positions (in a reference frame fixed with respect to the star sensor), and (optionally) magnitude information, for several ($N_{max}$) stars simultaneously. The value of $N_{max}$ depends on the tracker used. The star tracker 218, for which $N_{max}$ is taken to be 5, reports stars 410A–410E at Cartesian coordinate positions $(x_1, y_1)$ through $(x_{Nmax}, y_{Nmax})$ in the star tracker's field-of-view (FOV) 416. These (x,y) positions may be converted to unit vectors, expressed in the star tracker's reference frame 412, which includes a Z-axis 404 generally co-linear with the star sensor boresight 414, an X-axis 406, and a Y-axis 408. For trackers with a relatively small FOV 416 (typically, about 8 degrees by 8 degrees), any star position reported by the star tracker 218 will be translated to a unit vector with the Z-component close to, but just less than, one. The star tracker 218 may also report the stars' magnitudes, in addition to their positions.

If the star tracker 218 is rigidly attached to the spacecraft body 102, the star tracker reference frame 412 is another spacecraft body-fixed frame. Neglecting launch vibration, and or cumulative thermal deformation, a time-invariant transformation between the spacecraft body-fixed frame 112 and the star tracker reference frame 412, can be defined. This transformation is typically expressed in terms of a direction cosine matrix.

The true attitude of the spacecraft 100 (which is unknown) can be represented by a 3×3 direction cosine matrix $DCM_{eci \to body}$, wherein "ECI" or "eci" denotes the Earth-Centered Inertial reference frame 312, with origin 310 corresponding to the spacecraft 100 location. The spacecraft body reference frame 112 is taken to be a spacecraft body-fixed frame, defined by the orientation of a "reference" star tracker, or by the orientation of multiple "reference" star trackers.

An arbitrary position expressed as a 3-element vector, $v_{body}$, defined with respect to the body reference frame 112 will correspond to a 3-element vector, $v_{eci}$, defined with respect to the ECI frame, when $v_{body} = DCM_{eci \to body} v_{eci}$. If any direction cosine matrix, $DCM_{A \to B}$, is known, then its inverse, $DCM_{B \to A}$, is also known, and is equal to the transpose of $DCM_{A \to B}$.

Consider a spacecraft 100 having NumST star trackers 218 (NumST≧1), each tracking at least one star 410. A reference frame 412 can be associated with each star tracker 218, and this reference frame 412 can be used to describe the reported position of each star 410 sensed by the star tracker 218. For each star tracker 218, a nearly temporally constant orientation of the star tracker reference frame 412 can be described with respect to the spacecraft body frame 112. This orientation can be represented by the direction cosine matrix $DCM^A_{tracker \to body}$, wherein 1≦tracker≦NumST.

This value can be obtained from pre-launch measurements, if Lost-In-Space Stellar Attitude Acquisition (LISSAA) is run during initialization, or from previous usage of LISSAA, if available. The spacecraft body reference frame 112 is defined by the assumed orientation of one or more of the star trackers 218, designated as the "reference" star tracker.

$DCM^A_{tracker \to body}$, wherein 1≦tracker≦NumST is an approximation of the "true" tracker orientation (which depends on which tracker is chosen to be reference), $DCM_{tracker \to body}$. Because of star tracker 402 orientation misalignment errors, there will be a difference between the spacecraft body frame 112 and the assumed orientation, typically up to about 0.15 degrees. This difference $\epsilon_C$, can be described by the relation $\epsilon_C \geq a\cos(DCM_{tracker \to body} v \cdot DCM^A_{tracker \to body} v)$, for any arbitrary unit vector v. The function "$\operatorname{acos}(\bullet)$" returns a value in the range [0°, 180°].

The lost-in-space stellar attitude acquisition process accepts star tracker data, a star catalog (SC), and a pair catalog (PC) as input. The star tracker data includes the star position in the star tracker FOV 416, and, optionally, the star magnitude for up to $N_{max}$ stars from each of the NumST trackers. The star catalog includes a plurality of entries, each of which represents a star of magnitude $M_0^{SC}$ or brighter, wherein $M_0^{SC}$ must be less than (brighter) or equal to the minimum detectable star magnitude for the star sensor in use. In the preferred embodiment, (using the CT-602 star tracker described above) $M_0^{SC}$ is taken to be 6.2, yielding a SC with about 7500 entries. Each entry includes, for example, the right ascension and declination of the star in the ECI reference frame 312, and, if available, the instrument magnitude (predicted star magnitude, as measured by the instrument). The star catalog may also include the star's spectral class and sub-class.

The star pair catalog (PC) includes a plurality of entries, each of which represents a star of magnitude $M_0^{PC}$ or brighter (that is, $M_0^{PC} \leq M_0^{SC}$). For the preferred embodiment, $M_0^{PC}$ is taken as 6.0, yielding a PC with approximately 180,000 entries. Each entry includes, for example, the SC indices of both stars in the pair and the angular separation of the stars. In one embodiment, the angular separation of each pair of stars included in the PC must fall in the range $[\alpha_{min}, \alpha_{max}]$. In one embodiment, $\alpha_{min}$ is chosen so that the attitude determined from the pair of stars will have an error bound by $\epsilon^0_{\geq}$, and $\alpha_{min}$ is set to 2°. The parameter $\alpha_{max}$ is chosen to be the largest value such that both stars in the pair may be tracked by the same tracker. For the CT-602 tracker described herein, this value is $\alpha_{max} = 8\sqrt{2}°$. Although not required to practice the present invention, the entries in the PC may be sorted by angular separation, with the smallest separation first.

From this information, the present invention computes the following:

(1) An index, st, of the star 402 tracker designated to be the "reference tracker." This defines the body frame through $DCM^A_{st \to body}$;

(2) The centroid of the identified stars tracked by st, expressed in the body frame, $\mu_{body}$;

(3) An attitude estimate, represented by a direction cosine matrix $DCM'_{eci \to body}$;

(4) The error in the attitude estimate;

(4a) $\epsilon_\perp$, the estimated error about an axis perpendicular to $\mu_{body}$;

(4b) $\epsilon_\parallel$, the estimated upper bound on the error about an axis parallel to $\mu_{body}$;

(5) Alignment matrices for each tracker, which define the trackers' orientations, $DCM'_{tracker \to body}$; and (6) A list of identified stars tracked by each tracker.

(Note: for the reference tracker, and for trackers not tracking a sufficient number of well-distributed stars, $DCM'_{tracker \to body} = DCM^A_{tracker \to body}$).

The Lost-in-Space stellar attitude acquisition (LISSAA) system computes body-referenced and ECI referenced locations of two separate "reference" points to produce a first approximation of the attitude estimate. These reference points are determined through a succession of guesses. Each guess is a "primary assumption"—that a particular pair of stars tracked by star tracker st (the "primary pair", at star tracker-referenced positions $P_{st}$ and $P'_{st}$) corresponds to a particular entry in the PC (the "primary candidate pair", at ECI-referenced positions $C_{eci}$ and $C'_{eci}$). Each guess is followed by tests, designed to validate, or invalidate, the guess. The tests involve identifying tracked stars based on the first approximation of the attitude estimate and the primary assumption. If the guess is invalidated (as it will be most of the time), a different primary assumption is formed. If the guess is validated, the identified stars are used to produce a better estimate of the attitude.

Acquisition proceeds through maneuvering the spacecraft 100 in such a way that at least $N_{local}$ ($N_{local} \leq N_{max}$) stars are being tracked by at least one tracker, st (which will be the reference tracker), and a total of at least $N_{total}$ ($N_{local} \leq \text{NumST} \cdot N_{max}$) stars are being tracked by all the trackers.

Defining the positions of the stars tracked by star tracker st in the tracker FOV as $(X_{st}^i, Y_{st}^i)$ ($1 \leq i \leq N_{local}$), and given a subset consisting of M of st's tracked stars at positions $(X'^j_{st}, Y'^j_{st})$ ($1 \leq j \leq M \leq N_{local}$), the centroid position of the subset as the mean of the stars' positions can be defined as $$(\mu_x, \mu_y) = \frac{1}{M} \sum_{j=1}^{M} (X'^j_{st}, Y'^j_{st}) \tag{1}$$

Using $\sigma$, the absolute value of the standard deviation of the stars' positions:

$$\sigma_x^2 = \frac{1}{M} \sum_{j=1}^{M} (X'^j_{st} - \mu_x)^2$$

$$\sigma_y^2 = \frac{1}{M} \sum_{j=1}^{M} (Y'^j_{st} - \mu_y)^2$$

$$\sigma^2 = \sigma_x^2 + \sigma_y^2$$

Defining the "spread" of the stars, $\rho$, to be as follows:

$$\rho^2 \equiv M(\sigma_x^2 + \sigma_y^2) = \sum_{j=1}^{M} \left[ (X'^j_{st} - \mu_x)^2 + (Y'^j_{st} - \mu_y)^2 \right] \tag{2}$$

A reference frame may be defined, with respect to st, in which the tracked stars are at st-referenced positions $T_{st}^i = (\operatorname{atan}(X_{st}^i), \operatorname{atan}(Y_{st}^i), 1)/\| (\operatorname{atan}(X_{st}^i), \operatorname{atan}(Y_{st}^i), 1) \|$.

Using the assumed alignment of tracker-referenced vectors to body frame-referenced vectors may be characterized with the direction cosine matrix $DCM_{st \to body}$. From this, it is possible to characterize st's tracked stars in the body frame as $T_{body}^i = DCM_{st \to body} T_{st}^i$.

LISSAA is used to match tracked stars to entries in the star catalog. Assuming $N'_{local}$ of the $N_{local}$ tracked stars are identified; these stars are at body-referenced positions $T'^j_{body}$, ($1 \leq j \leq N'_{local}$) to their ECI equivalents (from the SC), $T'^j_{eci}$, ($1 \leq j \leq N'_{local}$) an attitude estimate, $DCM'_{eci \to body}$, may be obtained. If $(\mu_x, \mu_y)$ are defined as the centroid of the identified stars, the centroid position corresponds to the tracker-referenced vector $\mu_{st}$, which, in turn, corresponds to the body-referenced vector $\mu_{body}$.

The error in estimated attitude may be divided into two components; one a rotation about an axis perpendicular to $\mu_{body}$, $\epsilon_\perp$; the other a rotation about an axis parallel to $\mu_{body}$. The former may be estimated using the difference between the ECI-referenced star positions from the SC, and the predicted positions using tracker data and the attitude estimate:

$$\epsilon_\perp^2 = \frac{1}{N'_{local}} \sum_{j=1}^{local} |DCM'_{eci \to body} T'^j_{eci} - T'^j_{body}|^2 \tag{3}$$

The error about the axis parallel to $\mu_{body}$ cannot be estimated in a similar fashion, as error in the predicted ECI positions of tracked stars is correlated far more strongly with rotation about an axis perpendicular to $\mu_{body}$ than to one parallel to $\mu_{body}$. An estimate of the upper bound on this error, $\epsilon_\parallel$, is:

$$\epsilon_\parallel = \frac{\epsilon_T}{\sigma \sqrt{N'_{local}}} = \frac{\epsilon_T}{\rho} \tag{4}$$

where $\epsilon_T$ is the inherent error in tracker-reported star positions (typically about 15 arc-seconds).

All data fed into the LISSAA system comes from the star sensors, so it is defined with respect to the star sensors' frames-of-reference. Therefore, during LISSAA processing, the direction cosine matrix of interest is $DCM_{eci \to tracker}$ ($1 \leq \text{tracker} \leq \text{NumST}$), as opposed to $DCM_{eci \to body}$.

Stellar Attitude Acquisition Preparation

For the data from a star tracker to be useful for attitude determination, the spread of stars must be adequate. Since the spread $\rho$ is related to one component of attitude error, $\epsilon_\parallel$, the accuracy of the attitude determination can be improved by assuring that the spread of observed stars around the tracked star is as large as possible. The threshold spread value $\rho_{spread}$ should therefore be chosen to be consistent with the maximum allowable $\epsilon_\parallel$.

In one embodiment of the present invention, the spread $\rho$ of stars is computed for each star tracker to determine if the spread is at least a minimum threshold value. This can be accomplished, for example using the relationships described in equation (2) above. If the spread does not meet a minimum threshold value for a tracker tracking $N_{max}$ stars, various options are available. For the simplest, the track on star(s) closest to centroid is broken and a new track is established on other stars in the star sensor's FOV 416. This process is repeated until a sufficient spread of stars around the tracked star is obtained. Another option is to continue with LISSAA to establish an attitude estimate of sufficient accuracy to determine a set of SC stars in the star sensor FOV 416 meeting the threshold spread requirement. After that is done, the star sensor 218 may be commanded to track those stars, breaking track on some or all of the stars it is currently tracking. LISSA is repeated with the new set of tracked stars.

A list of observed (or tracked) stars is prepared for each star sensor 218. This list is referred to as TrackerPairs$_{tracker}$ (1≦tracker≦NumST). Each element of this list represents two different entries in TrackerOutput$_{tracker}$. TrackerOutput$_{tracker}$ is a list of the stars tracked by the tracker. This list comprises the star positions, expressed in the star sensor 218 reference frame, and (if available) the star magnitudes. All position/magnitude information comes from tracker output (as opposed to the SC), and knowledge of the mounting geometry of the star sensor 218. In one embodiment, the TrackerOutput$_{tracker}$ list is ordered by magnitude, with the brightest star first. TrackerPairs$_{tracker}$ includes all pairs such that: the stars in each pair have an angular separation of at least $\alpha_{min}$ and the TrackerOutput$_{tracker}$ index of the first element of the pair is less than the index of the second element. Further, in one embodiment, a further condition is applied, namely, that no TrackerOutput$_{tracker}$ entry appears as the first element of a pair in TrackerPairs$_{tracker}$ more than twice. (If such could happen, only the two pairs with the brightest second element of the pair shall appear in TrackerPairs$_{tracker}$). TrackerPairs$_{tracker}$ is a list of the star pairs to be used as primary pairs. This condition avoids wasting excessive time on an observed star that does not correspond to a cataloged star.

Stellar Attitude Acquisition

Figure 5:
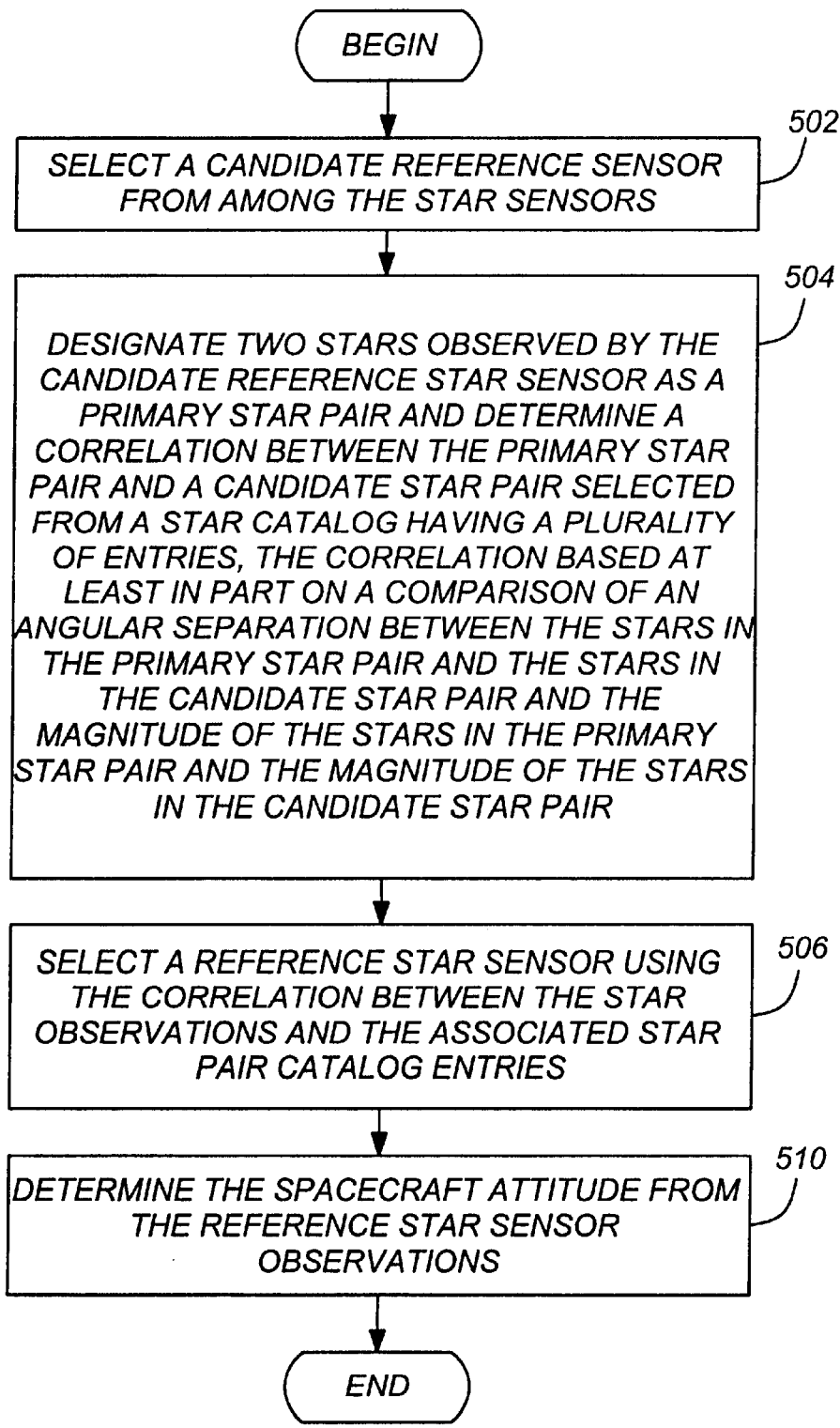
FIG. 5 is a flow chart presenting illustrative method steps used to practice the present invention.

FIG. 5 is a flow chart presenting illustrative method steps used to practice the present invention. A candidate (and tentative) reference sensor is selected from among the satellite's star sensors, as shown in block 502. The star sensor 218 is designated with an index (st), which is the smallest value for which TrackerOutput$_{st}$ contains at least $N_{local}$ stars and TrackerPairs$_{st}$ contains at least one entry. In one embodiment, the observations from each of the star sensors is examined before the candidate reference star sensor is selected. The candidate reference star sensor 218 is then chosen as the reference star sensor sensing the best combination of the number of stars and the spread of stars. Initial variables for the selected candidate star sensor are then set as follows:

found_attitude(st)←FALSE; and redundant_attitude(st)←FALSE

Should a unique attitude be obtained using st as the reference tracker after completion of the LISSAA, found_ attitude(st) is set to TRUE. Similarly, should at least two attitudes, differing by a non-trival amount, be found using st as the reference tracker after completion of LISSAA, redundant_attitude(st) is set to TRUE.

Next, as shown in block 503, two stars observed by the candidate reference star sensor 218 are designated as a primary star pair. In one embodiment, this is accomplished by defining the first pair in TrackerPairs$_{st}$ as the current "primary" pair, where the first element of the pair is designated as star P, and the second element is designated as star P'. $P_{0,st}$ (which is obtained from TrackerOutput$_{st}$) can also be defined as the observed position of P in the candidate reference tracker frame, and, if the tracker reports star magnitude, $P_{mag}$ as the instrument magnitude of P. $P'_{0,st}$ (which is obtained from TrackerOutput$_{st}$) can also be defined as the observed position of P' in the candidate reference tracker frame, and, if the tracker reports star magnitude, $P'_{mag}$ as the instrument magnitude of P'.

A PairCandidates list of star pairs from the pair catalog is then set up. The Pair Candidates list comprises "primary pair candidates." "Primary pair candidates" are entries in the PC that could (conceivably) be the primary pair (P and P'). Take a star pair as C and C', with ECI-referenced positions $C_{eci}$, and $C'_{eci}$, and, if the tracker reports star magnitude, and the magnitudes are entered in the SC instrument magnitudes $C_{mag}$, and $C'_{mag}$. To qualify for the PairCandidates list, the C–C' pair must satisfy the following conditions:

First, the angular separation between C and C', $\alpha_C$, must match the separation between P and P', $\alpha_P$, to within twice the maximum tracker measurement error, $2\epsilon_T$. That is, defining $\alpha_C \equiv \mathrm{acos}\,(C_{eci} \cdot C'_{eci})$ and $\alpha_{P0} \equiv \mathrm{acos}\,(P_{0,st} \cdot P'_{0,st})$, the criteria for inclusion in the PairCandidates list is:

$$|\alpha_C - \alpha_{P0}| \leq 2\epsilon_T \quad (5)$$

Second, if magnitude is provided by the star tracker, and magnitude is available in the SC, C must have an instrument magnitude within $\Delta_{mag}$ of P. That is, $$|C_{mag} - P_{mag}| \leq \Delta_{mag} \quad (6)$$

For the star sensor 218 used in the preferred embodiment, the value of $\Delta_{mag}$ is approximately 0.25. It should be noted that $\Delta_{mag}$ may well be a function of the candidate's class; if this is the case, it may be desirable to include star class in the SC.

Third, if magnitude is provided by the star tracker, and magnitude is available in the SC, C' must have an instrument magnitude within $\Delta_{mag}$ of P'. That is, $$|C'_{mag} - P'_{mag}| \leq \Delta_{mag} \quad (7)$$

Finally, in the event that attitude-related information is available, identification of P and P' as C and C' must be consistent with said information.

Such information could be the known position of a celestial body (e.g., the sun or the earth) in both the star tracker and inertial frames. Assume it is known that the body is at a position in the spacecraft body frame, $B_{body}$, which may be translated into a star tracker frame referenced position, $B_{st}$, and the body's position in the inertial frame is known to be $B_{eci}$. Define the possible error in the position is $\epsilon_B$. We may define:

$\beta_C \equiv \mathrm{acos}\,(B_{eci} \cdot C_{eci})$;

$\beta_{P0} \equiv \mathrm{acos}\,(B_{st} \cdot P_{0,st})$;

$\beta'_C \equiv \mathrm{acos}\,(B_{eci} \cdot C'_{eci})$; and $\beta'_{P0} \equiv \mathrm{acos}\,(B_{st} \cdot P'_{0,st})$ With these definitions, we require, as further criteria for inclusion on the PairCandidates list:

$$|\beta_C - \beta_{P0}| \leq \epsilon_B + \epsilon_T \quad (8)$$

$$|\beta'_C - \beta'_{P0}| \leq \epsilon_B + \epsilon_T \quad (9)$$

Alternatively, the attitude-related information could be a previously obtained attitude estimate, $DCM^0_{eci \to body}$, which when taken in conjunction with star tracker alignment estimates, may be used to calculate $DCM^O_{eci \to st}$. Define the possible error in $DCM^O_{eci \to body}$ as $\epsilon_D$; i.e., if any choice of unit vector $x_{eci}$, defined with respect to the ECI frame, corresponds to unit vector $x_{st}$, defined with respect to the st frame, then $|DCM^O_{eci \to st} x_{eci} - x_{st}| \leq \epsilon_D$. For that case, we require as further criteria for inclusion on the PairCandidates list:

$$|DCM^O_{eci \to st} C_{eci} - P_{0,st}| \leq \epsilon_D + \epsilon_T \qquad (10)$$

$$|DCM^O_{eci \to st} C'_{eci} - P'_{0,st}| \leq \epsilon_D + \epsilon_T \qquad (11)$$

A star pair from the PC can appear on PairCandidates twice; first, with the first element of the pair as C, and the second as C', and second, with the roles reversed.

A "tentative match" is assumed between the primary star pair and a candidate star pair selected from the PairCandidates list; this assumption is the "primary assumption." The spacecraft 100 attitude can then be determined from the use of the TRIAD algorithm (described in "Spacecraft Attitude Determination and Control", edited by James R. Wertz, in Section 12.2.2, written by Gerald M. Lerner (1978), which is hereby incorporated by reference herein, or equivalent algorithm on the primary pair and primary pair candidate. As shown in blocks 504 an orientation of the candidate reference star tracker with respect to an inertial reference frame is determined. If a threshold number of stars are identified to allow determination of the orientation of the candidate reference star tracker, a new reference star tracker is chosen (if any) and processing returns to block 503. If a threshold number of stars have not been identified, a new primary star pair is chosen, and processing is routed to block 504. Then, a reference star tracker is selected based on a star identification made with the selected reference star tracker, as shown in block 506, and the spacecraft attitude is determined based on the star tracker orientations and on which star tracker is chosen to be the reference star tracker, as shown in block 510. Finally, the orientation of the star trackers can be determined based on the attitude estimate of the orientation of the candidate reference star trackers, as shown in block 512.

Figure 6A:
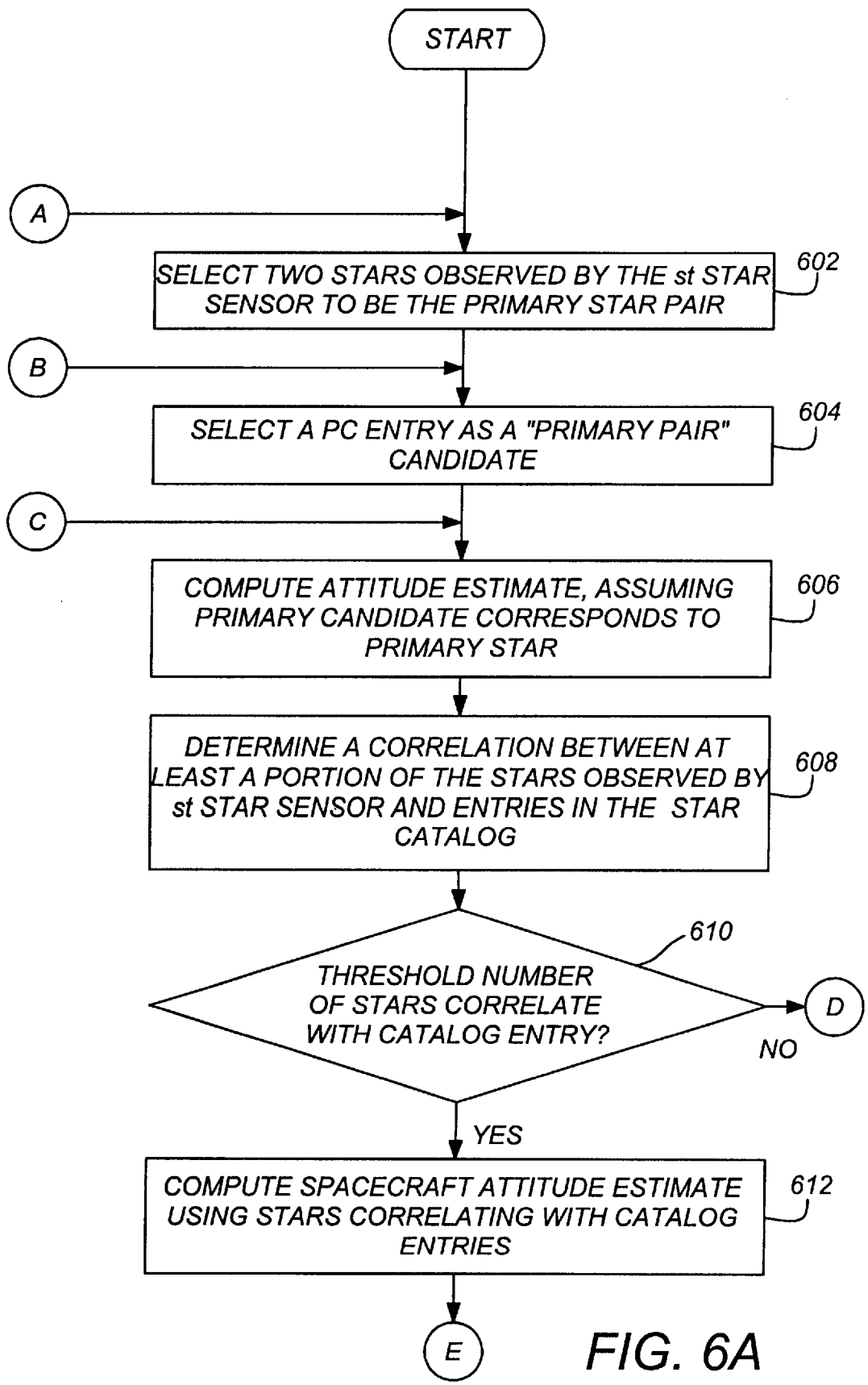
FIGS. 6A–6C are flow charts of the exemplary process steps used in one embodiment of the present invention to determine the spacecraft attitude, the star sensors' orientations with respect to the spacecraft, the stars in the sensors' fields-of-view, and to select the reference star sensor.
Figure 6B:
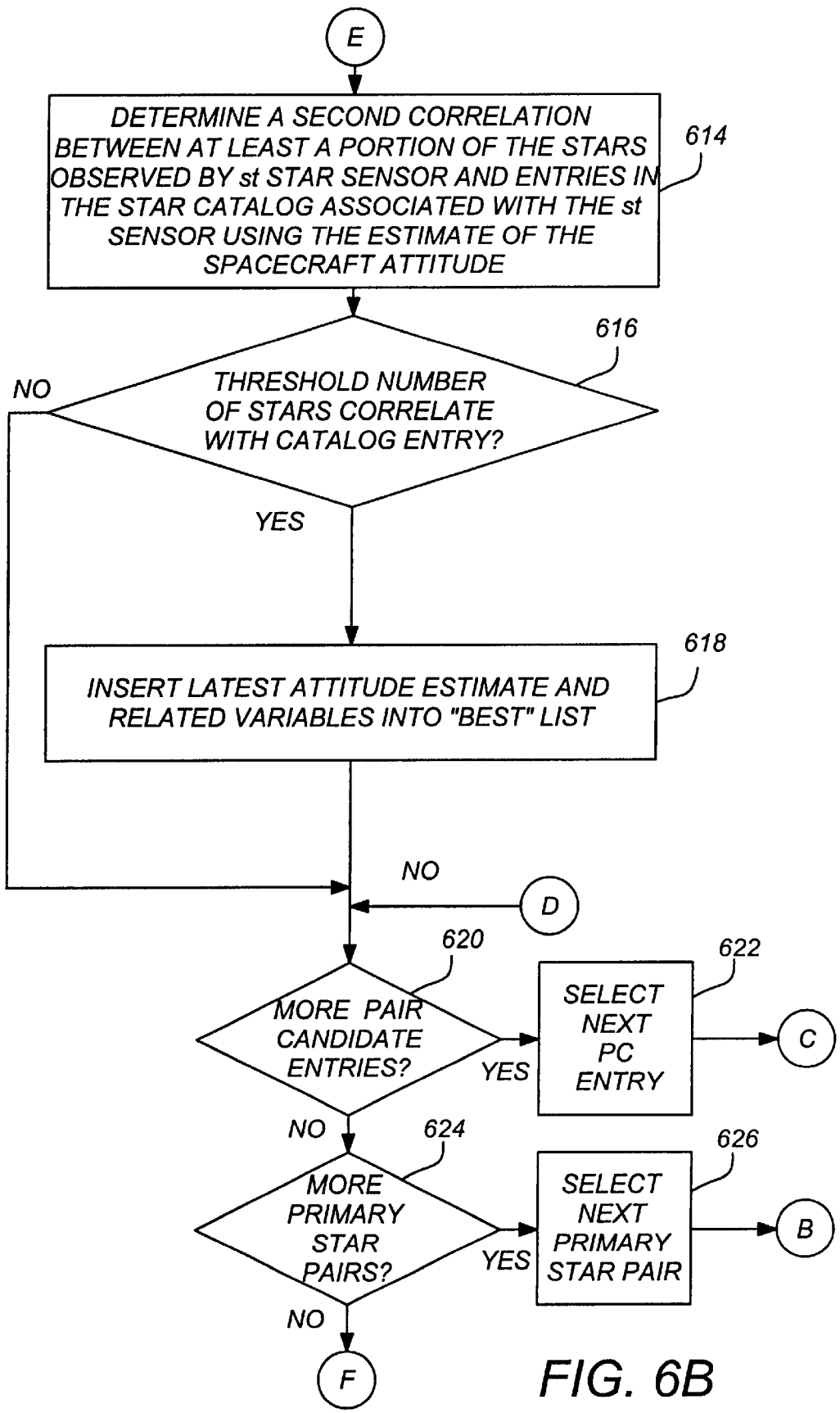
Figure 6C:
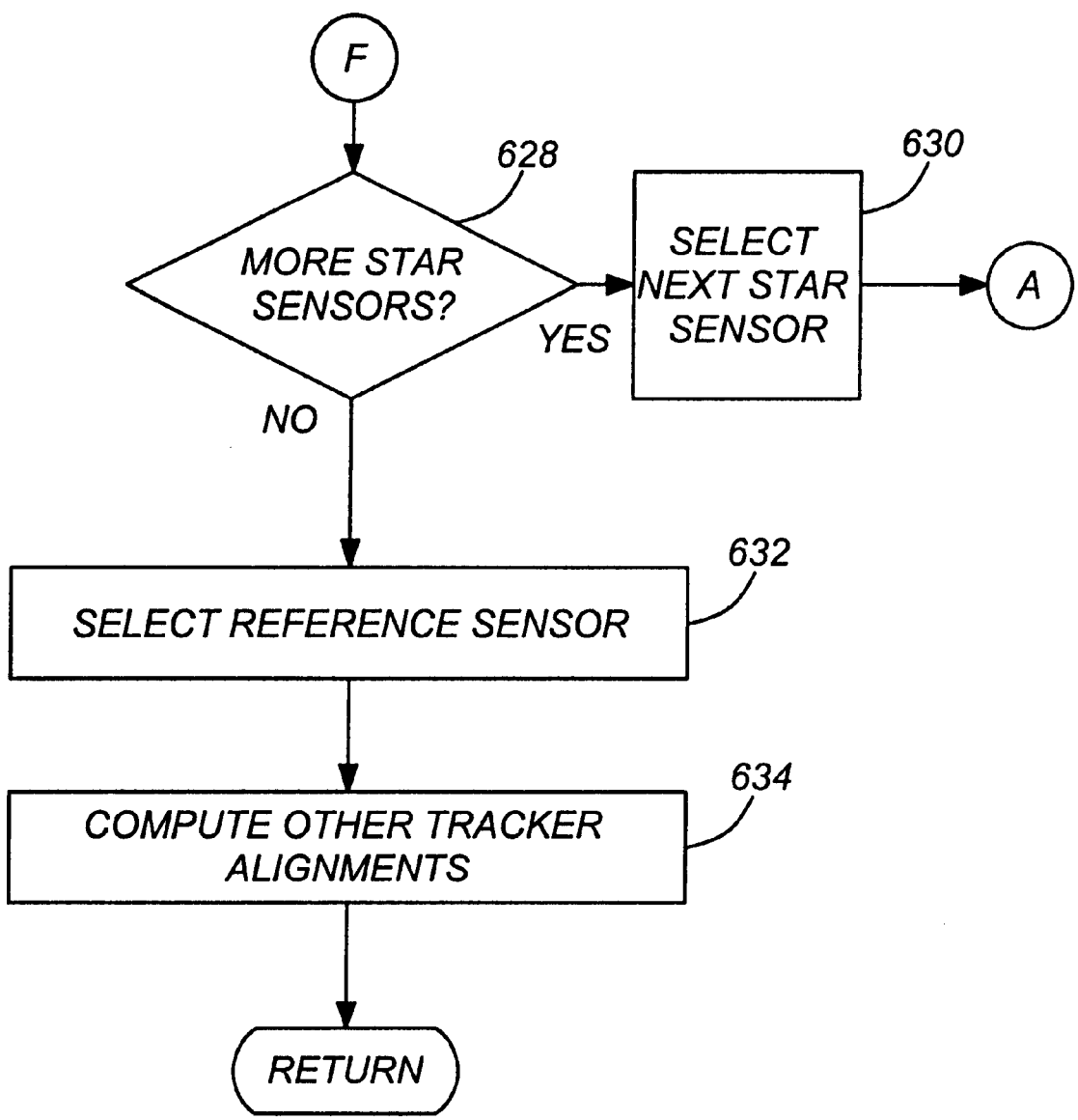

FIGS. 6A–6C are flow charts of the exemplary process steps used in one embodiment of the present invention to determine the spacecraft attitude, orientation of the star trackers with respect to the spacecraft, identity of the stars in the trackers' field-of-view, and to select the reference star tracker.

Two stars observed by the st star tracker (sensor) are selected as the primary star pair, as shown in block 602. A tentative assumption is then made that the primary pair is the $j^{th}$ pair in PairCandidates list, thus associating the primary star pair with the candidate star pair from the star pair catalog. (The variable j is an iterative counter that is used to identify which of the star pair candidates in the PairCandidates list is currently designated as the "primary" star pair. The variable j is initially set to some value (1, in the preferred embodiment) and is used to identify which of the star pair candidates is currently under consideration.) This assumption (referred to hereinafter as the "primary assumption") is used to revise the estimate of the primary pair's positions from the star sensor, and to provide an attitude estimate as described below.

Using the primary assumption a first approximation of the spacecraft 100 attitude is computed. This is shown in block 606 of FIG. 6. As described below, this attitude estimate is then used to attempt at direct match of the stars in the star sensors' FOV 416. Should enough stars be matched, the assumption will be investigated further. If not, it will be rejected.

Using the pair catalog, given the primary assumption, the primary pair, P and P', position estimates (obtained directly from star sensor 218 data) may be refined. Assuming that the primary pair candidate, C and C', correspond to the primary pair, the angular separation between the stars in the primary pair, $\alpha_{P0} = \text{acos}(P_{0,st} \cdot P'_{0,st})$, should be equal to the angular separation between the primary pair candidate, $\alpha_C = \text{acos}(C_{eci} \cdot C'_{eci})$. If they do differ, it must be by no more than $2\epsilon_T$, from our criteria in choosing the pair candidates (in accordance with equation(7)). To refine the position estimates of the primary pair, each of $P_{0,st}$ and $P'_{0,st}$, are rotated in opposite directions, through an angle $(\alpha_{P0} - \alpha_C)/2$ about an axis perpendicular to both positions, $P_{0,st} \times P'_{0,st}$. The directions of rotation are chosen such that the separation between the "refined" positions of P and P', defined to be $P_{st}$ and $P_{st}$, are now equal to $\alpha_C$.

As shown in block 606, an attitude estimate, represented by direction cosine matrix $DCM^B_{eci \to st}$, is obtained. This is because a unique $DCM^B_{eci \to st}$ can be designed to map $P_{st}$ to $C_{eci}$, and $P'_{st}$ to $C'_{eci}$. $DCM^B_{eci \to st}$ may be derived.

Next, as shown in block 608, an attempt is made to identify stars observed by tracker st as corresponding to entries in the star catalog. This is performed by attempting a "modified direct match" on the star sensor outputs, using the primary assumption, and latest attitude estimate, represented by direction cosine matrix $DCM^B_{eci \to st}$ as shown below.

This modified direct match may be defined as follows. Assume an observed star S is tracked by star sensor k, (where $1 \leq k \leq \text{NumST}$), and (if the tracker reports instrument magnitude, with instrument magnitude (magnitude of star S as measured by star sensor k) $S_{mag}$. Further, define $S_k$ tp be the position, with respect to tracker k's reference frame, of observed star S, as reported by star tracker k. Using the (rough) tracker alignment knowledge obtained above, S is at position $S_{st}$, defined with respect to tracker st's reference frame, where $S_{st} = DCM^A_{body \to st} \cdot DCM^A_{k \to body} S_k$.

Observed star S is identified as SC entry E, with (if the tracker reports instrument magnitude, and the SC contains magnitude information) instrument magnitude $E_{mag}$, at ECI-referenced position $E_{eci}$, if a modified direct match may be made between the two. A modified direct match may be made between S and E if SC entry E uniquely satisfies the following conditions:

1. $E_{eci}$ and the estimated position of the observed star in the ECI frame, $DCM^B_{st \to eci} S_{st}$, have an angular separation of no more than a certain amount (the position tolerance, $\tau_{pos}$);
2. The angular separation between $S_{st}$ and $P_{st}$ matches the angular separation between $E_{eci}$ and $C_{eci}$ to within a certain amount (the separation tolerance, $\tau_{sep}$);
3. The angular separation between $S_{st}$ and $P'_{st}$ matches the angular separation between $E_{eci}$ and $C'_{eci}$ to within a certain amount (the separation tolerance, $\tau_{sep}$);
4. In the event that magnitude information is provided by the tracker, and if magnitude information is stored in the SC, $E_{mag}$ must be within a certain value (the magnitude tolerance, $\tau_{mag}$) of $S_{mag}$; and
5. In the event that attitude-related information is available, identification of S as corresponding to SC entry E must be consistent with said information.

Such information could be the known position of a celestial body (e.g., the sun or the earth) in both the star tracker and inertial frames. Assume it is known that the body is at a position in the spacecraft body frame, $B_{body}$, which may be translated into a star tracker frame referenced position, $B_{st}$, and the body's position in the inertial frame is known to be $B_{eci}$. We may define:

$\beta_E \equiv acos (B_{eci} \cdot E_{eci})$; and $\beta_S \equiv acos (B_{st} \cdot S_{st})$;

Given a separation tolerance $\tau_B$, then with these definitions, we require, as a further criteria for modified direct match between S and E, $|\beta_E - \beta_S| \leq \tau_B$ Alternatively, the attitude-related information could be a previously obtained attitude estimate, $DCM^0_{eci \to body}$, which when taken in conjunction with star tracker alignment estimates, may be used to calculate $DCM^0_{eci \to st}$. For this case, given an error tolerance $\tau_D$, we require, as a further criteria for modified direct match between S and E, $|DCM^0_{eci \to st} E_{eci} - S_{st}| \leq \tau_D$.

A modified direct match is attempted with each star in TrackerOutput$_k$ ($1 \leq k \leq $NumST), using the primary assumption as the baseline, and the primary candidate as the baseline catalog entry.

A determination is then made as to whether the observed data from the candidate reference star tracker are consistent with the primary assumption, and resulting attitude estimate. In one embodiment, this is accomplished by determining if a threshold number of observed stars may be identified as corresponding to the catalog entries, as shown in block 610. This can be accomplished as described below.

Defining $\epsilon_k$ as the star tracker angular position error; $\epsilon_k = \epsilon_T$, when k is the reference tracker (i.e., k=st); $\epsilon_k = \epsilon_T + \epsilon_C$, otherwise. The tolerances can then be defined as follows:

$\tau_{mag} \leftarrow \Delta_{mag}$ $\tau_{pos} \leftarrow 2\epsilon_k + \epsilon_T \sin(\beta)/\sin(\alpha_C)$ {where $\beta$ is max [acos $(S_{st} \cdot P_{st})$, acos $(S_{st} \cdot P'_{st})$]}

$\tau_{sep} \leftarrow 2\epsilon_k$

Defining $M^1_{local}$ to be the number of stars from TrackerOutput$_{st}$ for which a modified direct match is established; define $M^1_{total}$ to be the number of stars from all of the TrackerOutput lists for which a direct match is established. (Of course, $M^1_{local} \leq M^1_{total}$). A decision is made to determine whether the number of matches thus obtained justifies further investigation, based upon the primary assumption.

If $M^1_{local} \geq N_{local}$, and $M^1_{total} \geq N_{total}$ (where $N_{local}$ and $N_{total}$ are pre-set constants), the primary assumption has been supported (although not yet validated), and processing continues to block 612. Otherwise, it is abandoned, and processing jumps to block 620.

The optimum values of $N_{local}$ and $N_{total}$ are important to performance of this algorithm and depend on the star trackers used. Given trackers capable of simultaneously tracking up to $N_{max}$ stars, the following criteria apply:

1. $N_{local} \leq N_{max}$.
2. $N_{local} > 2$. If not, acquisition could be made with one star identified by the candidate reference star sensor, and multiple stars identified by another star sensor 218. Acquisition in such a case is susceptible to large errors (~1°) representing a rotation of the true attitude about an axis parallel (or nearly parallel) to the other star sensor's boresight. Because of (rare) cases where three stars of roughly equal magnitude are co-linear, close together and evenly spaced, (e.g., Orion's Belt), it is advisable to set $N_{local}$ to 3.
3. $N_{total} \geq N_{local}$.
4. $N_{total} \geq 4$. There are cases where two widely separated triplets of stars exist, where stars in one triplet match, in angular separation from the other stars, the corresponding star in the other triplet. Setting $N_{total} > 3$ is necessary to avoid erroneous acquisition.
5. $N_{total} \leq N_{max}$. This applies so that acquisition may proceed with only one tracker tracking stars.

A second (refined) estimate of the spacecraft 100 attitude is generated using the stars which were identified with the candidate reference star tracker, st. This is shown in block 612. This is accomplished as described below.

At this point, the $M^1_{local}$ ($\geq N_{local} \geq 2$) stars have been identified in the FOV 416 of the reference tracker, st. This identification allows a mapping of at least two vectors, expressed in the candidate reference star sensor's reference frame, to vectors expressed in the ECI frame.

If a more accurate estimate of attitude then available at this point is required, an estimate of the spacecraft 100 attitude, represented by direction cosine matrix $DCM^C_{eci \to st}$, can be determined from those vectors, given that $M^1_{local} \geq 3$. With that condition, an optimization algorithm may be used, to determine the "best" attitude estimate; such algorithms are discussed in various texts (e.g., Chapter 11 of James R. Wertz' Spacecraft Attitude Determination and Control, which is hereby incorporated by reference herein).

The error in the estimate is a function of $M^1_{local}$, star tracker accuracy, and star tracker orientation. Because of the high accuracy of star tracker measurements with (the preferred star sensor 218 has temporal noise errors in the order of about 6arc-sec/$\sqrt{M^1_{local}}$) the attitude error with respect to axes perpendicular to the star sensor boresight 414 is expected to be much smaller than the corresponding error associated with the previous estimate. This estimate is validated, in one embodiment, by attempting another modified direct match on the star tracker outputs, using the primary assumption, and latest attitude estimate, as described below.

Another attempt is made to form a modified direct match with each star in TrackerOutput$_k$ ($1 \leq k \leq $NumST). The purpose of this match is to verify that the latest attitude estimate has not made matters worse. Then, $M^2_{local}$ is defined to be the number of stars from TrackerOutput$_{st}$ for which a modified direct match is established, and $M^2_{total}$ is defined to be the number of stars from all of the TrackerOutput lists for which a direct match is established. (Of course, $M^2_{local} \leq M^2_{total}$).

Next, a decision is made as to whether the number of matches obtained justifies further investigation based on the primary assumption. As before, continuation of work based on the primary assumption is decided at this step. If $M^2_{local} \geq N_{local}$, and $M^2_{total} \geq N_{total}$ the primary assumption has been supported (although not yet validated). Otherwise, the primary assumption is abandoned, and control jumps to block 620.

If the primary assumption is retained, a list is defined, IdentifiedStars$_{st,k}$, with an entry for each star identified during the previous step, tracked by tracker k ($1 \leq k \leq $NumST). Each entry includes the index number in TrackerOutput$_k$ of the tracked star; and the catalog number in the SC of the identified star.

At this point, the centroid and spread of the identified stars tracked by the reference tracker must be calculated, according to the equations described above. Using these values, the estimated error about the axis perpendicular to the centroid, $\epsilon_\perp$, and an estimated upper bound about an axis parallel to the centroid, $\epsilon_\parallel$, may be calculated, using equations (3) and (4). If either of these values exceed a certain threshold, the attitude estimate and the primary assumption are rejected processing is also routed to block 620. If the error values do not exceed the threshold, processing is routed to block 618, which inserts the latest attitude estimates and related variable into a "best" list.

If $M^2_{local} \geq N^X_{local}$ (where $N^X_{local}$ is a pre-set constant greater than $N_{local}$), i.e., at least $N^X_{local}$ stars have been identified in the FOV 416 of the candidate reference star sensor, the primary assumption is considered validated, and the attitude estimate, as represented by $DCM^C_{eci \to st}$ is accepted. For the embodiment discussed here, $N^X_{local}$ is chosen to be 4. That is, if four stars are identified in the FOV 416 of the reference tracker, based upon the latest attitude estimate, the chance of that estimate being incorrect is negligible. The following variable values and flags are also set, and processing is routed to block 620.

found_attitude (st)←TRUE
redundant_attitude (st)←FALSE
best_$\epsilon_\parallel$ (st)←$\epsilon_\parallel$;
best_$\epsilon_\perp$ (st)←$\epsilon_\perp$;
best_$\mu_{body}$ (st)←$\mu_{body}$;
best_$DCM_{eci \to st}$ (st)←$DCM^C_{eci \to st}$;
best_IdentifiedStars (st,k)←IdentifiedStars$_{st,k}$
($1 \leq k \leq$ NumST);
best_N_IdentifiedStars (st)←$M^2_{local}$.

If $M^2_{local} < N^X_{local}$, then if the found_attitude flag for this tracker is not set, the following variables and flags are set:
found_attitude (st)←TRUE
best_$\epsilon_\parallel$ (st)←$\epsilon_\parallel$;
best_$\epsilon_\perp$ (st)←$\epsilon_\perp$;
best_$\mu_{body}$ (st)←$\mu_{body}$;
best_$DCM_{eci \to st}$ (st)←$DCM^C_{eci \to st}$;
best_IdentifiedStars (st, k)←IdentifiedStars$_{st,k}$
($1 \leq k \leq$ NumST);
best_N_IdentifiedStars (st)←$M^2_{local}$.

Otherwise, if the found_attitude flag for this tracker is already set, there are at least two "validated" primary assumptions and associated attitudes.

If the current attitude estimate differs from the attitude we refer to as best_$DCM_{eci \to st}$ for this tracker by more than a certain threshold, set the flag redundant_attitude(st)←TRUE. Otherwise, if the attitude estimate difference is below threshold, then if the current $\epsilon_\parallel \leq$ best_$\epsilon_\parallel$ (st), the following variables and flags are set:
best_$\epsilon_\parallel$ (st)←$\epsilon_\parallel$;
best_$\epsilon_\perp$ (st)←$\epsilon_\perp$;
best_$\mu_{body}$ (st)←$\mu_{body}$;
best_$DCM_{eci \to st}$ (st)←$DCM^C_{eci \to st}$;
best_IdentifiedStars (st, k)←IdentifiedStars$_{st,k}$
($1 \leq k \leq$ NumST);
best_N_IdentifiedStars (st)←$M^2_{local}$.

Returning again to FIG. 6B, processing is then passed to block 620. At this point, we have completed all computations for the currently defined primary pair of stars. The variable j is then changed (incremented, in the preferred embodiment) to select the next element of the PairCandidates entry, and processing is returned to block 606, as shown in blocks 620 and 622.

If there are no further pair candidate entries, processing is passed to block 624. At this point, all computations required for the primary pair of stars has been completed. The current primary pair entry (first entry) is deleted from TrackerPairs$_{st}$. If there is still at least one pair left in TrackerPairs$_{st}$, the next primary star pair is selected, as shown in block 626, and processing is passed to block 606.

At this point, all of the computations required for the case of a tracker st as the reference tracker are completed. If additional star sensors 218 are available, another star sensor 218 is selected, and processing is returned to block 602. This is illustrated in blocks 628 and 630. In one embodiment, this is accomplished by setting the variable st to the smallest value (greater than its current value) for which the TrackerOutput$_{st}$ includes at least $N_{local}$ stars, and TrackerPairs$_{st}$ contains at least one entry. If such an st star sensor exists, it is selected and processing is routed to block 602.

Block 632 selects, from among the candidate reference star sensors 218, a candidate reference star sensor, and block 634 computes the alignment of the other star sensors 218. Further, block 634 returns processing to block 510, wherein the spacecraft 100 attitude is determined. In one embodiment, the alignment of the other star sensors 218 is computed from the measurements from the reference star sensor, or reference star sensors, alone. In another embodiment, the alignment of the star sensors is computed using the measurements from a plurality of star sensors 218. In this case, a best estimate of the spacecraft 100 attitude is computed from at least two of the star sensors 218 and used to estimate the alignment errors. This estimate could be improved with the use of three star sensors 218, but the improvement is small in comparison to the improvement obtained using two star sensors 218. This is shown in block 512.

In one embodiment, the selection of the reference star sensor is accomplished as follows. If there is no tracker for which the found_attitude flag is TRUE, and the redundant_attitude flag is FALSE, no valid attitude estimate exists, and the algorithm has failed to acquire an attitude. Track must be broken on the observed stars, tracks on different stars must be established, and process begun anew.

If, for at least one tracker, the found_attitude flag is TRUE, and redundant_attitude flag is FALSE, a valid attitude estimate exists. If only one such tracker meets that criterion, a tracker with tracker index best_st, then the following variables and flags are set:
1. Reference tracker index←best_st
2. $\mu_{body}$←best_$\mu_{body}$ (best_st)
3. $DCM'_{eci \to body}$←$DCM^A_{best\_body}$best_$DCM_{eci \to st}$ (best_st);
4. Errors in the attitude estimate, including $\epsilon_\parallel$←best_$\epsilon_\parallel$ (best→st) and $\epsilon_\perp$←best_$\epsilon_\perp$ (best_st);
5. $DCM'_{tracker \to body}$←$DCM^A_{tracker \to body}$ for all trackers; and
6. IdentifiedStars$_{st,k}$ ($1 \leq k \leq$ NumST)←best_IdentifiedStars (best_st, k).

If there is more than one tracker for which the found_attitude flag is TRUE, and redundant_attitude flag is FALSE, more than one choice exists for a reference tracker. For the preferred embodiment, the reference tracker is chosen to be the tracker with index best_st such that best_IdentifiedStars (best_st, best_st) ≥ best_IdentifiedStars (k, k) ($1 \leq k \leq$ NumST). The reference tracker may then be chosen as the tracker with the greatest number of identifiable stars, and hence, the following variables and flags are set:
1. Reference tracker index←best_st;
2. $\mu_{body}$←best_$\mu_{body}$ (best_st);
3. $DCM'_{eci \to body}$←$DCM^A_{best\_st \to body}$best_$DCM_{eci \to st}$ (best_st);
4. Errors in the attitude estimate, $\epsilon_\parallel$←best_$\epsilon_\parallel$ (best_st), and $\epsilon_\perp$←best_$\epsilon_\perp$ (best_st);
5. For all trackers with index k ($1 \leq k \leq$ NumST) such that found_attitude (k) is TRUE and redundant_attitude is FALSE, set $DCM'_{k \to body}$←$DCM'_{eci \to body}$ best_$DCM_{st \to eci}$ (k);
6. For all trackers with index k ($1 \leq k \leq$ NumST) such that found_attitude (k) is FALSE or redundant_attitude is TRUE, set $DCM'_{k \to body}$←$DCM^A_{k \to body}$; and
7. IdentifiedStars$_{st,k}$ ($1 \leq k \leq$ NumST)←best_IdentifiedStars (best_st, k).

Conclusion

This concludes the description of the preferred embodiments of the present invention. In summary, the present invention describes a method and apparatus for determining the attitude of a spacecraft having at least one star sensor 218, and, if there exist a plurality of star trackers, estimating the alignment of the star trackers. In one embodiment, the method includes the steps of selecting a candidate reference star tracker from among the star trackers 218; designating two stars observed by the candidate reference star tracker as the "primary star pair"; extracting a list of "candidate star pairs" from a star pair catalog having a plurality of entries, where a candidate star pair is a catalog entry that could be the primary star pair; formulating the "primary assumption", the assumption that the primary star pair corresponds to a particular candidate star pair selected from the candidate star pair list; estimating the spacecraft 100 attitude; determining the validity of the primary assumption, and derived attitude, based on the identification of observed stars as star catalog entries, given the assumption and derived attitude; if required, determining a refined attitude estimate, based on the star identifications done in the previous step; repeating the determination of attitude, star identification, and, if required, refinement of attitude, using a different primary assumption; determining attitude and star identification based on observed stars by different candidate reference trackers (if any); selecting a reference star tracker, or trackers, from the candidate reference star trackers; estimating spacecraft attitude based on the determination of attitude from the reference star tracker, or trackers; and, if there is more than one star tracker, determining star tracker alignment, based on assumptions of the alignment of the reference star tracker or trackers.

The present invention provides a procedure for estimating attitude of spacecraft 100 equipped with at least one star tracker, capable of simultaneously tracking multiple ($N_{max}$) stars ($N_{max}$~5). This procedure determines attitude using identified ("matched") stars observed by the star sensor(s) as entries in a star catalog, which includes a list of star positions, and may optionally include instrument magnitudes (the magnitude of a star as observed by the star sensor, and if necessary, star classes.

The present invention can be implemented in the satellite 100 or in an associated ground station. Unlike existing systems, the present invention will accept and use attitude-related information if supplied.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of determining an attitude of a spacecraft having a plurality of star sensors, comprising the steps of:
   selecting a first reference star sensor from among the star sensors;
   designating two stars observed by the first reference star sensor as a primary star pair;
   identifying a candidate star pair corresponding to the primary star pair, wherein the candidate star pair is selected from a star catalog having a plurality of entries;
   estimating an inertial orientation of the first reference star sensor at least in part from the identified candidate star pair; and
   determining the spacecraft attitude from the estimated inertial orientation of the reference star sensor;
   wherein the step of determining the spacecraft attitude based on the orientation of the reference star sensor comprises the steps of:
      selecting a second reference star sensor from among the star sensors;
      designating two stars observed by the second reference star sensor as a second primary star pair;
      identifying a second candidate star pair selected from the star catalog corresponding to the primary star pair;
      estimating an inertial orientation of the second reference star sensor at least in part from the identified second candidate star pair;
      selecting at least one reference star sensor from the group comprising first reference star sensor and the second reference star sensor;
      determining the spacecraft attitude from the selected reference star sensor and an orientation of the selected reference star sensor with respect to the spacecraft; and
      wherein at least one of the star sensors comprises a star tracker providing a reported position and a reported magnitude of one or more tracked stars for a period of time until the star tracker no longer tracks the star.

2. The method of claim 1, wherein the spacecraft attitude is further determined from an assumed orientation of the first reference star sensor with respect to the spacecraft.

3. The method of claim 1, wherein the first reference star sensor is chosen from among the star sensors based at least in part on the number of stars observed by each of the star sensors and an angular separation between the stars observed by each star sensor.

4. The method of claim 1, wherein the first reference star sensor is chosen from among the star sensors based at least in part on a magnitude of each of the stars observed by each of the star sensors.

5. The method of claim 1, wherein the primary star pair is chosen, at least in part, on a magnitude of each of the stars of the primary star pair.

6. The method of claim 1, wherein the identification of the candidate star pair is based at least in part on a comparison of an angular separation between the stars in the primary star pair and an angular separation between the stars in the candidate star pair.

7. The method of claim 1, wherein the identification of the candidate star pair is based at least in part on a comparison of a magnitude of the stars in the primary star pair and a magnitude of the stars in the candidate star pair.

8. The method of claim 1 wherein the identification of the candidate star pair is based at least in part on available attitude-related information.

9. The method of claim 1, further comprising the steps of:
   determining an orientation of the second reference star sensor relative to the first reference star sensor from the estimate of the orientation of the first reference star sensor and an estimate of the orientation of the second reference star sensor; and
   determining an orientation of the second reference star sensor relative to the spacecraft from the orientation of the second reference star sensor relative to the first reference star sensor and an estimate of an orientation of the first reference star sensor with respect to the spacecraft.

10. The method of claim 1, wherein the step of determining the spacecraft attitude based on the orientation of the candidate star sensor comprises the steps of:

selecting a second reference star sensor from among the star sensors;

designating two stars observed by the second reference star sensor as a second primary star pair;

identifying a second candidate star pair selected from the star catalog corresponding to the primary star pair;

estimating an inertial orientation of the second reference star sensor at least in part from the identified second candidate star pair;

selecting at least two reference star sensors from the group comprising first reference star sensor and the second reference star sensor; and determining the spacecraft attitude from the estimated inertial orientation of the first reference star sensor and the estimated inertial orientation of the second reference star sensor and an orientation of the first reference star sensor and the second reference star sensor with respect to the spacecraft.

11. The method of claim 10, further comprising the step of:

determining the orientation of the first reference star sensor relative to the second reference star sensor from the estimate of the inertial orientation of the first reference star sensor and the estimate of the inertial orientation of the second reference star sensor;

determining the orientation of the first and second reference star sensors relative to the spacecraft from the orientation of the first reference star sensor relative to the second reference star sensor and an estimate of the orientation of the first reference star sensor and the second reference star sensor relative to the spacecraft.

12. The method of claim 1, wherein the star catalog entries each comprise a star position value, and the step of identifying a candidate star pair corresponding to the primary star pair comprises the steps of:

(a) associating the primary star pair with a candidate star pair from the star catalog;

(b) using the associated primary star pair and candidate star pair, identifying the candidate star pair as corresponding to the primary star pair if a threshold number of stars observed by the first reference star sensor are identified as star catalog entries;

(c) associating another candidate star pair from the star catalog and repeating step (b) if a sufficient number of stars observed by the first reference star sensor are not identified as star catalog entries.

13. The method of claim 12, further comprising the step of:

generating a list of star pair candidates from the star catalog; and selecting the candidate star pair from the list of star pair candidates.

14. The method of claim 13, further comprising the steps of:

compare an angular separation between the stars in the primary star pair and the angular separation of the stars in the list of star pair candidates; and eliminate star pair candidates from the list of star pair candidates if the angular separation between the stars in the primary star pair and the angular separation of the stars in the list of star pair candidates is not within an angular separation value.

15. The method of claim 13, further comprising the steps of:

comparing a magnitude of the stars in the primary star pair and a magnitude of the stars in the list of star pair candidates; and eliminate star pair candidates from the list of star pair candidates if the difference between the magnitude of the stars in the primary star pair and the magnitude of the either of the stars in the list of star pair candidates exceeds a magnitude value.

16. The method of claim 13, further comprising the steps of:

accepting attitude information; and eliminating star pair candidates from the list of star pair candidates based on the attitude information.

17. The method of claim 13, wherein the primary star pair comprises a first primary star and a second primary star, and the step of identifying a threshold number of stars observed by the reference star sensors as corresponding to a star catalog entries comprises the steps of:

determining an orientation of the first star sensor provided that the primary star pair corresponds to the candidate star pair;

determining an angular separation between a star observed by the first reference star sensor and the first primary star;

determining a second angular separation between the star observed by the first reference star sensor and the second primary star; and identifying the observed star as corresponding to a star catalog entry if the first angular separation differs from a first predicted separation by less than a first threshold amount and the second angular separation differs from a second predicted separation by less than a second threshold amount.

18. The method of claim 17, wherein:

the method further comprises the step of determining a magnitude of the star observed by the first star sensor; and the identification of the observed star as corresponding to a star catalog entry is based at least in part on a comparison of the magnitude of the observed star to a predicted magnitude.

19. The method of claim 17, wherein:

the method further comprises the step of obtaining attitude-related information; and wherein the identification of the observed star as corresponding to a star catalog entry is based at least in part upon the attitude information.

20. The method of claim 1, further comprising the step of:

determining if a tracked star is unsuitable for determining the attitude of the spacecraft; and commanding the star tracker to abandon track on the tracked star if the tracked star is determined to be unsuitable for determining the attitude of the spacecraft, and to track other stars more suitable for determining the attitude of the spacecraft than the tracked star.

21. The method of claim 20, wherein the step of determining if a tracked star is unsuitable for determining the attitude of the spacecraft suitability of the tracked stars is based, at least in part, on the magnitude of the tracked star.

22. The method of claim 20, wherein the suitability of the tracked star is based, at least in part, on the reported position of the tracked star.

23. An apparatus for determining an attitude of a spacecraft having a plurality of star sensors, comprising a processor, communicatively coupled to the at least one star sensor and to a memory storing instructions for:
- selecting a first reference star sensor from among the star sensors;
- designating two stars observed by the first reference star sensor as a primary star pair;
- identifying a candidate star pair corresponding to the primary star pair, wherein the candidate star pair is selected from a star catalog having a plurality of entries;
- estimating an inertial orientation of the first reference star sensor at least in part from the identified candidate star pair; and
- determining the spacecraft attitude from the estimated inertial orientation of a reference star sensor selected from a group comprising the first star sensor;
- wherein the instructions for determining the spacecraft attitude based on the orientation of the reference star sensor comprises:
    - selecting a second reference star sensor from among the star sensors;
    - designating two stars observed by the second reference star sensor as a second primary star pair;
    - identifying a second candidate star pair selected from the star catalog corresponding to the primary star pair;
    - estimating an inertial orientation of the second star sensor at least in part from the identified second candidate star pair;
    - selecting at least one reference star sensor from the group comprising first star sensor and the second star sensor;
    - determining the spacecraft attitude from the selected reference star sensor and an orientation of the reference star sensor with respect to the spacecraft; and
    - wherein at least one of the star sensors comprises a star tracker providing a reported position and a reported magnitude of one or more tracked stars for a period of time until the star tracker no longer tracks the star.

24. The apparatus of claim 23, wherein the spacecraft attitude is further determined from an assumed orientation of the reference star sensor with respect to the spacecraft.

25. The apparatus of claim 23, wherein the first reference star sensor is chosen from among the star sensors based at least in part on the number of stars observed by each of the star sensors and an angular separation between the stars observed by each star sensor.

26. The apparatus of claim 23, wherein the first reference star sensor is chosen from among the star sensors based at least in part on a magnitude of each of the stars observed by each of the star sensors.

27. The apparatus of claim 23, wherein the primary star pair is chosen, at least in part, on a magnitude of each of the stars of the primary star pair.

28. The apparatus of claim 23, wherein the identification of the candidate star pair is based at least in part on a comparison of an angular separation between the stars in the primary star pair and an angular separation between the stars in the candidate star pair.

29. The apparatus of claim 23, wherein the identification of the candidate star pair is based at least in part on a comparison of a magnitude of the stars in the primary star pair and a magnitude of the stars in the candidate star pair.

30. The apparatus of claim 23, wherein the identification of the candidate star pair is based at least in part on available attitude-related information.

31. The apparatus of claim 23, wherein the instructions further comprise:
- determining an orientation of the second reference star sensor relative to the first reference star sensor from the estimate of the orientation of the first reference star sensor and an estimate of the orientation of the second reference star sensor; and
- determining an orientation of the second reference star sensor relative to the spacecraft from the orientation of the second reference star sensor relative to the first reference star sensor and an estimate of an orientation of the first reference star sensor with respect to the spacecraft.

32. The apparatus of claim 23, wherein the instructions for determining the spacecraft attitude based on the orientation of the candidate star sensor comprises:
- selecting a second reference star sensor from among the star sensors;
- designating two stars observed by the second reference star sensor as a second primary star pair;
- identifying a second candidate star pair selected from the star catalog corresponding to the primary star pair;
- estimating an inertial orientation of the second reference star sensor at least in part from the identified second candidate star pair;
- selecting at least two reference star sensors from the group comprising first reference star sensor and the second reference star sensor; and
- determining the spacecraft attitude from the estimated inertial orientation of the first reference star sensor and the estimated inertial orientation of the second reference star sensor and an orientation of the first reference star sensor and the second reference star sensor with respect to the spacecraft.

33. The apparatus of claim 32, wherein the instructions further comprise:
- determining the orientation of the first reference star sensor relative to the second reference star sensor from the estimate of the inertial orientation of the first reference star sensor and the estimate of the inertial orientation of the second reference star sensor;
- determining the orientation of the first and second reference star sensors relative to the spacecraft from the orientation of the first reference star sensor relative to the second reference star sensor and an estimate of the orientation of the first reference star sensor and the second reference star sensor relative to the spacecraft.

34. The apparatus of claim 32, wherein the star catalog entries each comprise a star position value, and the instructions for identifying a candidate star pair corresponding to the primary star pair comprises:
- (a) associating the primary star pair with a candidate star pair from the star catalog;
- (b) using the associated primary star pair and candidate star pair, identifying the candidate star pair as corresponding to the primary star pair if a threshold number of stars observed by the first reference star sensor are identified as star catalog entries; and
- (c) associating another candidate star pair from the star catalog and repeating step (b) if a sufficient number of stars observed by the first reference star sensor are not identified as star catalog entries.

35. The apparatus of claim 34, wherein the instructions further comprise:

generating a list of star pair candidates from the star catalog; and selecting the candidate star pair from the list of star pair candidates.

36. The apparatus of claim 35, wherein the instructions further comprise:

comparing an angular separation between the stars in the primary star pair and the angular separation of the stars in the list of star pair candidates; and eliminating star pair candidates from the list of star pair candidates if the angular separation between the stars in the primary star pair and the angular separation of the stars in the list of star pair candidates is not within an angular separation value.

37. The apparatus of claim 35, wherein the instructions further comprise:

comparing a magnitude of the stars in the primary star pair and a magnitude of the stars in the list of star pair candidates; and eliminate star pair candidates from the list of star pair candidates if the difference between the magnitude of the stars in the primary star pair and the magnitude of the either of the stars in the list of star pair candidates exceeds a magnitude value.

38. The apparatus of claim 35, wherein the instructions further comprise:

accepting attitude information; and eliminating star pair candidates from the list of star pair candidates based on the attitude information.

39. The apparatus of claim 34, wherein the primary star pair comprises a first primary star and a second primary star, and the instruction for identifying a threshold number of stars observed by the reference star sensors as corresponding to a star catalog entries comprises:

determining an orientation of the first star sensor provided that the primary star pair corresponds to the candidate star pair;

determining an angular separation between a star observed by the first reference star sensor and the first primary star;

determining a second angular separation between the star observed by the first reference star sensor and the second primary star; and identifying the observed star as corresponding to a star catalog entry if the first angular separation differs from a first predicted separation by less than a first threshold amount and the second angular separation differs from a second predicted separation by less than a second threshold amount.

40. The apparatus of claim 39, wherein:

the instructions further comprise instructions for determining a magnitude of the star observed by the first star sensor; and the identification of the observed star as corresponding to a star catalog entry is based at least in part on a comparison of the magnitude of the observed star to a predicted magnitude.

41. The apparatus of claim 40, wherein:

the instructions further comprise instructions for obtaining attitude-related information; and wherein the identification of the observed star as corresponding to a star catalog entry is based at least in part upon the attitude information.

42. The method of claim 23, further comprising the step of:

determining if a tracked star is unsuitable for determining the attitude of the spacecraft; and commanding the star tracker to abandon track on the tracked star if the tracked star is determined to be unsuitable for determining the attitude of the spacecraft, and to track other stars more suitable for determining the attitude of the spacecraft than the tracked star.

43. The method of claim 42, wherein the step of determining if a tracked star is unsuitable for determining the attitude of the spacecraft suitability of the tracked stars is based, at least in part, on the magnitude of the tracked star.

44. The method of claim 42, wherein the suitability of the tracked star is based, at least in part, on the reported position of the tracked star.

45. A program storage device, readable by a computer, tangibly embodying at least one program of instructions executable by the computer to perform method steps of determining an attitude of a spacecraft having a plurality of star sensors, the method steps comprising the steps of:

selecting a first reference star sensor from among the star sensors;

designating two stars observed by the first reference star sensor as a primary star pair;

identifying a candidate star pair corresponding to the primary star pair, wherein the candidate star pair is selected from a star catalog having a plurality of entries;

estimating an inertial orientation of the first star sensor at least in part from the identified candidate star pair; and determining the spacecraft attitude from the estimated inertial orientation of the reference star sensor;

wherein the step of determining the spacecraft attitude based on the orientation of the reference star sensor comprises the steps of:

selecting a second reference star sensor from among the star sensors;

designating two stars observed by the second reference star sensor as a second primary star pair;

identifying a second candidate star pair selected from the star catalog corresponding to the primary star pair;

estimating an inertial orientation of the second reference star sensor at least in part from the identified second candidate star pair;

selecting at least one reference star sensor from the group comprising first reference star sensor and the second reference star sensor;

determining the spacecraft attitude from the selected reference star sensor and an orientation of the selected reference star sensor with respect to the spacecraft; and wherein at least one of the star sensors comprises a star tracker providing a reported position and a reported magnitude of one or more tracked stars for a period of time until the star tracker no longer tracks the star.

46. A method of determining an attitude of a spacecraft, comprising the steps of:

designating two stars observed by a first reference star sensor as a primary star pair;

identifying a candidate star pair corresponding to the primary star pair, wherein the candidate star pair is selected from a star catalog having a plurality of entries;

estimating an inertial orientation of the first reference star sensor at least in part from the identified candidate star pair; and determining the spacecraft attitude from the estimated inertial orientation of the first reference star sensor;

wherein the step of identifying a candidate star pair corresponding to the primary star pair comprises the steps of:

(a) associating the primary star pair with a candidate star pair from the star catalog;

(b) using the associated primary star pair and candidate star pair, identifying the candidate star pair as corresponding to the primary star pair if a threshold number of stars observed by the first reference star sensor are identified as star catalog entries;

(c) associating another candidate star pair from the star catalog and repeating step (b) if a sufficient number of stars observed by the first reference star sensor are not identified as star catalog entries; and wherein the first reference star sensor comprises a star tracker providing a reported position and a reported magnitude of one or more tracked stars for a period of time until the star tracker no longer tracks the star.

47. The method of claim 46, wherein the spacecraft attitude is further determined from an assumed orientation of the first reference star sensor with respect to the spacecraft.

48. The method of claim 46, wherein the first reference star sensor is chosen from among a plurality of star sensors based at least in part on the number of stars observed by each of the plurality of star sensors and an angular separation between the stars observed by each star sensor.

49. The method of claim 46, wherein the first reference star sensor is chosen from among a plurality of star sensors based at least in part on a magnitude of each of the stars observed by each of the star sensors.

50. The method of claim 46, wherein the primary star pair is chosen, at least in part, on a magnitude of each of the stars of the primary star pair.

51. The method of claim 46, wherein the identification of the candidate star pair is based at least in part on a comparison of an angular separation between the stars in the primary star pair and an angular separation between the stars in the candidate star pair.

52. The method of claim 46, wherein the identification of the candidate star pair is based at least in part on a comparison of a magnitude of the stars in the primary star pair and a magnitude of the stars in the candidate star pair.

53. The method of claim 46, wherein the identification of the candidate star pair is based at least in part on available attitude-related information.

54. The method of claim 46, wherein the step of determining the spacecraft attitude based on the orientation of the candidate star sensor comprises the steps of:

selecting a second reference star sensor from among a plurality of star sensors;

designating two stars observed by the second reference star sensor as a second primary star pair;

identifying a second candidate star pair selected from the star catalog corresponding to the primary star pair;

estimating an inertial orientation of the second reference star sensor at least in part from the identified second candidate star pair;

selecting at least one reference star sensor from the group comprising first reference star sensor and the second reference star sensor; and determining the spacecraft attitude from the selected reference star sensor and an orientation of the reference star sensor with respect to the spacecraft.

55. The method of claim 54, further comprising the steps of:

determining an orientation of the second reference star sensor relative to the first reference star sensor from the estimate of the orientation of the first reference star sensor and an estimate of the orientation of the second reference star sensor; and determining an orientation of the second reference star sensor relative to the spacecraft from the orientation of the second reference star sensor relative to the first reference star sensor and an estimate of an orientation of the first reference star sensor with respect to the spacecraft.

56. The method of claim 46, wherein the step of determining the spacecraft attitude based on the orientation of the candidate star sensor comprises the steps of:

selecting a second reference star sensor from among a plurality of star sensors;

designating two stars observed by the second reference star sensor as a second primary star pair;

identifying a second candidate star pair selected from the star catalog corresponding to the primary star pair;

estimating an inertial orientation of the second reference star sensor at least in part from the identified second candidate star pair;

selecting at least two reference star sensors from the group comprising first reference star sensor and the second reference star sensor; and determining the spacecraft attitude from the estimated inertial orientation of the first reference star sensor and the estimated inertial orientation of the second reference star sensor and an orientation of each of the first reference star sensor and the second reference star sensor with respect to the spacecraft.

57. The method of claim 56, further comprising the step of:

determining the orientation of the first reference star sensor relative to the second reference star sensor from the estimate of the inertial orientation of the first reference star sensor and the estimate of the inertial orientation of the second reference star sensor;

determining the orientation of the first reference star sensor and the second reference star sensor relative to the spacecraft from the orientation of the first reference star sensor relative to the second reference star sensor and an estimate of the orientation of the first reference star sensor and the second reference star sensor relative to the spacecraft.

58. The method of claim 46, further comprising the step of:

generating a list of star pair candidates from the star catalog; and selecting the candidate star pair from the list of star pair candidates.

59. The method of claim 58, further comprising the steps of:

compare an angular separation between the stars in the primary star pair and the angular separation of the stars in the list of star pair candidates; and eliminate star pair candidates from the list of star pair candidates if the angular separation between the stars in the primary star pair and the angular separation of the stars in the list of star pair candidates is not within an angular separation value.

60. The method of claim 58, further comprising the steps of:
comparing a magnitude of the stars in the primary star pair and a magnitude of the stars in the list of star pair candidates; and
eliminate star pair candidates from the list of star pair candidates if the difference between the magnitude of the stars in the primary star pair and the magnitude of the either of the stars in the list of star pair candidates exceeds a magnitude value.

61. The method of claim 58, further comprising the steps of:
accepting attitude information; and
eliminating star pair candidates from the list of star pair candidates based on the attitude information.

62. The method of claim 58, wherein the primary star pair comprises a first primary star and a second primary star, and the step of identifying a threshold number of stars observed by the reference star sensors as corresponding to a star catalog entries comprises the steps of:
determining an orientation of the first reference star sensor provided that the primary star pair corresponds to the candidate star pair;
determining an angular separation between a star observed by the first reference star sensor and the first primary star;
determining a second angular separation between the star observed by the first reference star sensor and the second primary star; and
identifying the observed star as corresponding to a star catalog entry if the first angular separation differs from a first predicted separation by less than a first threshold amount and the second angular separation differs from a second predicted separation by less than a second threshold amount.

63. The method of claim 62, wherein:
the method further comprises the step of determining a magnitude of the star observed by the first reference star sensor; and
the identification of the observed star as corresponding to a star catalog entry is based at least in part on a comparison of the magnitude of the observed star to a predicted magnitude.

64. The method of claim 62, wherein:
the method further comprises the step of obtaining attitude-related information; and
wherein the identification of the observed star as corresponding to a star catalog entry is based at least in part upon the attitude information.

65. The method of claim 54, further comprising the step of:
determining if a tracked star is unsuitable for determining the attitude of the spacecraft; and
commanding the star tracker to abandon track on the tracked star if the tracked star is determined to be unsuitable for determining the attitude of the spacecraft, and to track other stars more suitable for determining the attitude of the spacecraft than the tracked star.

66. The method of claim 65, wherein the step of determining if a tracked star is unsuitable for determining the attitude of the spacecraft suitability of the tracked stars is based, at least in part, on the magnitude of the tracked star.

67. The method of claim 65, wherein the suitability of the tracked star is based, at least in part, on the reported position of the tracked star.

68. An apparatus method of determining an attitude of a spacecraft, comprising a processor, communicatively coupled to first reference star sensor and to a memory storing instructions for:
designating two stars observed by a first reference star sensor as a primary star pair wherein the first reference star sensor comprises a star tracker providing a reported position and a reported magnitude of one or more tracked stars for period of time until the star tracker no longer tracks the star;
identifying a candidate star pair corresponding to the primary star pair, wherein the candidate star pair is selected from a star catalog having a plurality of entries;
estimating an inertial orientation of the first star sensor at least in part from the identified candidate star pair; and
determining the spacecraft attitude from the estimated inertial orientation of the reference star sensor;
wherein the step of identifying a candidate star pair corresponding to the primary star pair comprises the steps of:
(a) associating the primary star pair with a candidate star pair from the star catalog;
(b) using the associated primary star pair and candidate star pair, identifying the candidate star pair as corresponding to the primary star pair if a threshold number of stars observed by the first reference star sensor are identified as star catalog entries;
(c) associating another candidate star pair from the star catalog and repeating step (b) if a sufficient number of stars observed by the first reference star sensor are not identified as star catalog entries.

69. The apparatus of claim 68, wherein the spacecraft attitude is further determined from an assumed orientation of the first reference star sensor with respect to the spacecraft.

70. The apparatus of claim 68, wherein the first reference star sensor is chosen from among a plurality of star sensors based at least in part on the number of stars observed by each of the plurality of star sensors and an angular separation between the stars observed by each star sensor.

71. The apparatus of claim 68, wherein the first reference star sensor is chosen from among a plurality of star sensors based at least in part on a magnitude of each of the stars observed by each of the star sensors.

72. The apparatus of claim 68, wherein the primary star pair is chosen, at least in part, on a magnitude of each of the stars of the primary star pair.

73. The apparatus of claim 68, wherein the identification of the candidate star pair is based at least in part on a comparison of an angular separation between the stars in the primary star pair and an angular separation between the stars in the candidate star pair.

74. The apparatus of claim 68, wherein the identification of the candidate star pair is based at least in part on a comparison of a magnitude of the stars in the primary star pair and a magnitude of the stars in the candidate star pair.

75. The apparatus of claim 68, wherein the identification of the candidate star pair is based at least in part on available attitude-related information.

76. The apparatus of claim 68, wherein the step of determining the spacecraft attitude based on the orientation of the candidate star sensor comprises the steps of:
selecting a second reference star sensor from among a plurality of star sensors;
designating two stars observed by the second reference star sensor as a second primary star pair;

identifying a second candidate star pair selected from the star catalog corresponding to the primary star pair;

estimating an inertial orientation of the second reference star sensor at least in part from the identified second candidate star pair;

selecting at least one reference star sensor from the group comprising first reference star sensor and the second reference star sensor; and determining the spacecraft attitude from the selected reference star sensor and an orientation of the reference star sensor with respect to the spacecraft.

77. The apparatus of claim 76, further comprising the steps of:

determining an orientation of the second reference star sensor relative to the first reference star sensor from the estimate of the orientation of the first reference star sensor and an estimate of the orientation of the second reference star sensor; and determining an orientation of the second reference star sensor relative to the spacecraft from the orientation of the second reference star sensor relative to the first reference star sensor and an estimate of an orientation of the first reference star sensor with respect to the spacecraft.

78. The apparatus of claim 68, wherein the step of determining the spacecraft attitude based on the orientation of the candidate star sensor comprises the steps of:

selecting a second reference star sensor from among a plurality of star sensors;

designating two stars observed by the second reference star sensor as a second primary star pair;

identifying a second candidate star pair selected from the star catalog corresponding to the primary star pair;

estimating an inertial orientation of the second reference star sensor at least in part from the identified second candidate star pair;

selecting at least two reference star sensors from the group comprising first reference star sensor and the second reference star sensor; and determining the spacecraft attitude from the estimated inertial orientation of the first reference star sensor and the estimated inertial orientation of the second reference star sensor and an orientation of each of the first reference star sensor and the second reference star sensor with respect to the spacecraft.

79. The apparatus of claim 78, further comprising the step of:

determining the orientation of the first reference star sensor relative to the second reference star sensor from the estimate of the inertial orientation of the first reference star sensor and the estimate of the inertial orientation of the second reference star sensor;

determining the orientation of the first reference star sensor and the second reference star sensor relative to the spacecraft from the orientation of the first reference star sensor relative to the second reference star sensor and an estimate of the orientation of the first reference star sensor and the second reference star sensor relative to the spacecraft.

80. The apparatus of claim 68, further comprising the step of:

generating a list of star pair candidates from the star catalog; and selecting the candidate star pair from the list of star pair candidates.

81. The apparatus of claim 80, further comprising the steps of:

compare an angular separation between the stars in the primary star pair and the angular separation of the stars in the list of star pair candidates; and eliminate star pair candidates from the list of star pair candidates if the angular separation between the stars in the primary star pair and the angular separation of the stars in the list of star pair candidates is not within an angular separation value.

82. The apparatus of claim 80, further comprising the steps of:

comparing a magnitude of the stars in the primary star pair and a magnitude of the stars in the list of star pair candidates; and eliminate star pair candidates from the list of star pair candidates if the difference between the magnitude of the stars in the primary star pair and the magnitude of the either of the stars in the list of star pair candidates exceeds a magnitude value.

83. The apparatus of claim 80, further comprising the steps of:

accepting attitude information; and eliminating star pair candidates from the list of star pair candidates based on the attitude information.

84. The apparatus of claim 80, wherein the primary star pair comprises a first primary star and a second primary star, and the step of identifying a threshold number of stars observed by the reference star sensors as corresponding to a star catalog entries comprises the steps of:

determining an orientation of the first reference star sensor provided that the primary star pair corresponds to the candidate star pair;

determining an angular separation between a star observed by the first reference star sensor and the first primary star;

determining a second angular separation between the star observed by the first reference star sensor and the second primary star; and identifying the observed star as corresponding to a star catalog entry if the first angular separation differs from a first predicted separation by less than a first threshold amount and the second angular separation differs from a second predicted separation by less than a second threshold amount.

85. The apparatus of claim 84, wherein:

the method further comprises the step of determining a magnitude of the star observed by the first reference star sensor; and the identification of the observed star as corresponding to a star catalog entry is based at least in part on a comparison of the magnitude of the observed star to a predicted magnitude.

86. The apparatus of claim 84, wherein:

the method further comprises the step of obtaining attitude-related information; and wherein the identification of the observed star as corresponding to a star catalog entry is based at least in part upon the attitude information.

87. The method of claim 68, further comprising the step of:

determining if a tracked star is unsuitable for determining the attitude of the spacecraft; and commanding the star tracker to abandon track on the tracked star if the tracked star is determined to be unsuitable for determining the attitude of the spacecraft, and to track other stars more suitable for determining the attitude of the spacecraft than the tracked star.

88. The method of claim 87, wherein the step of determining if a tracked star is unsuitable for determining the attitude of the spacecraft suitability of the tracked stars is based, at least in part, on the magnitude of the tracked star.

89. The method of claim 87, wherein the suitability of the tracked star is based, at least in part, on the reported position of the tracked star.

90. A program storage device, readable by a computer, tangibly embodying at least one program of instructions executable by the computer to perform method steps of determining an attitude of a spacecraft, the method steps comprising the steps of:

designating two stars observed by a first reference star sensor as a primary star pair wherein the first reference star sensor comprises a star tracker providing a reported position and a reported magnitude of one or more tracked stars for period of time until the star tracker no longer tracks the star;

identifying a candidate star pair corresponding to the primary star pair, wherein the candidate star pair is selected from a star catalog having a plurality of entries;

estimating an inertial orientation of the first star sensor at least in part from the identified candidate star pair; and determining the spacecraft attitude from the estimated inertial orientation of the reference star sensor;

wherein the step of identifying a candidate star pair corresponding to the primary star pair comprises the steps of:
 (a) associating the primary star pair with a candidate star pair from the star catalog;
 (b) using the associated primary star pair and candidate star pair, identifying the candidate star pair as corresponding to the primary star pair if a threshold number of stars observed by the first reference star sensor are identified as star catalog entries;
 (c) associating another candidate star pair from the star catalog and repeating step (b) if a sufficient number of stars observed by the first reference star sensor are not identified as star catalog entries.

* * * * *